(12) United States Patent
Van Wijmeersch et al.

(10) Patent No.: US 11,211,791 B2
(45) Date of Patent: Dec. 28, 2021

(54) STACKED CLAMPS ELECTROSTATIC DISCHARGE PROTECTION DEVICE

(71) Applicant: Sofics BVBA, Gistel (BE)

(72) Inventors: Sven Van Wijmeersch, Gistel (BE); Stefaan Verleye, Gistel (BE); Benjamin Ernest Henri Virginie Van Camp, Gistel (BE)

(73) Assignee: SOFICS BVBA, Gistel (BE)

( * ) Notice: Subject to any disclaimer, the term of this patent is extended or adjusted under 35 U.S.C. 154(b) by 0 days.

(21) Appl. No.: 16/985,373

(22) Filed: Aug. 5, 2020

(65) Prior Publication Data

US 2021/0044106 A1 Feb. 11, 2021

Related U.S. Application Data

(60) Provisional application No. 62/882,641, filed on Aug. 5, 2019.

(51) Int. Cl.
*H02H 9/04* (2006.01)

(52) U.S. Cl.
CPC .................................. *H02H 9/045* (2013.01)

(58) Field of Classification Search
CPC ............. H01L 27/0248; H01L 27/0251; H01L 27/0255; H01L 27/0259; H01L 27/0262; H01L 27/0266; H01L 27/0277; H01L 27/0285; H01L 27/0292; H01R 13/6485; H02H 9/045; H02H 9/046; H05K 1/0254; H05K 1/0257; H05K 1/0259; H05K 9/0067
See application file for complete search history.

(56) References Cited

U.S. PATENT DOCUMENTS

| | | | | |
|---|---|---|---|---|
| 5,959,820 | A * | 9/1999 | Ker | H01L 27/0248 361/111 |
| 7,589,944 | B2 * | 9/2009 | Mergens | H01L 27/0262 361/111 |
| 10,026,712 | B2 * | 7/2018 | Kunz, Jr. | H01L 25/00 |
| 2003/0076636 | A1 * | 4/2003 | Ker | H01L 27/0262 361/56 |

* cited by examiner

*Primary Examiner* — Jared Fureman
*Assistant Examiner* — Nicolas Bellido
(74) *Attorney, Agent, or Firm* — Volpe Koenig

(57) ABSTRACT

An electrostatic discharge (ESD) protection device including a stack of ESD clamps, a trigger circuit, and a transistor. The trigger circuit may respond to an ESD event by conducting current, which may cause the transistor to turn on. A combination of the trigger circuit conducting current and the transistor turning on may trigger the ESD clamps into a conducting state to shunt current from a first node to a second node.

20 Claims, 34 Drawing Sheets

STACKED CLAMPS ELECTROSTATIC DISCHARGE PROTECTION DEVICE

CROSS REFERENCE TO RELATED APPLICATION(S)

This application claims the benefit of U.S. Provisional Application No. 62/882,641, filed on Aug. 5, 2019, which is/are incorporated by reference as if fully set forth.

FIELD OF THE DISCLOSURE

The disclosure generally relates to Electrostatic Discharge (ESD) protection, latch up (LU), prevention, and prevention of damage during electrical overstress (EOS) conditions. More specifically, the disclosure relates to a method of protecting an integrated circuit (IC) against ESD damages, while maintaining high levels of LU robustness and EOS protection.

BACKGROUND

During an ESD event, large currents may flow through an integrated circuit (IC) which can potentially cause damage. Damage can occur within a device that conducts current resulting from the ESD event. Damage can also occur in devices over which a significant voltage is dropped due to the current flow resulting from the ESD event. To avoid damage due to an ESD event, clamps may be added to an IC design. These clamps may be configured to shunt the large ESD current without causing a large voltage drop over any sensitive node of the IC.

SUMMARY

An electrostatic discharge (ESD) protection device is disclosed. In one embodiment, the ESD protection device may be coupled between a first node and a second node. The ESD protection device may include a first ESD clamp, a second ESD clamp, and a third ESD clamp. An anode of the first ESD clamp may be coupled to the first node, a cathode of the third ESD clamp may be coupled to the second node, and the second ESD clamp may be coupled between the first ESD clamp and the third ESD clamp. The ESD protection device may further include a first PMOS transistor, wherein a source of the first PMOS transistor may be coupled to a trigger tap of the first ESD clamp and a drain of the first PMOS transistor may be coupled to either a trigger tap of the second ESD clamp or a trigger tap of the third ESD clamp. The ESD protection device may further include a first resistor coupled to a gate of the first PMOS transistor. The ESD protection device may further include a trigger circuit coupled between a gate of the first PMOS transistor and either the trigger tap of the third ESD clamp or the trigger tap of the second ESD clamp. The trigger circuit may be coupled to a different trigger tap than the drain of the first PMOS transistor. Furthermore, the trigger circuit may be configured to conduct current in response to an ESD event.

In another embodiment, the ESD protection device may include a second PMOS transistor and a fourth ESD clamp. The fourth ESD clamp may be coupled between either the first ESD clamp and the second ESD clamp or the second ESD clamp and the third ESD clamp. A source of the second PMOS transistor may be coupled to the source of the first PMOS transistor, a gate of the second PMOS transistor may be coupled to the gate of the first PMOS transistor, and a drain of the second PMOS transistor may be coupled to a trigger tap of the fourth ESD clamp.

In another embodiment, the ESD protection device may include a second PMOS transistor, a second resistor coupled between a gate of the second PMOS transistor and a source of the second PMOS transistor, and a fourth ESD clamp coupled between the second ESD clamp and the third ESD clamp. The source of the second PMOS transistor may be coupled to the gate of the first PMOS transistor, the gate of the second PMOS transistor may be coupled to an anode of the trigger circuit, a drain of the second PMOS transistor may be coupled to a trigger tap of the fourth ESD clamp, and the trigger circuit may be coupled to the gate of the first PMOS transistor through the second resistor.

In another embodiment, the first resistor may be coupled between the trigger tap of the first ESD clamp and the gate of the first PMOS transistor.

In another embodiment, the ESD protection device may include a first NMOS transistor, a second resistor, and a fourth ESD clamp coupled between either the second ESD clamp and the third ESD clamp or the first ESD clamp and the second ESD clamp. The drain of the first PMOS transistor may be coupled to the trigger tap of the second ESD clamp, the second resistor may be coupled to a gate of the first NMOS transistor, a drain of the first NMOS transistor may be coupled to a trigger tap of the fourth ESD clamp, a source of the first NMOS transistor may be coupled to the trigger tap of the third ESD clamp, the trigger circuit may be coupled to the gate of the first NMOS transistor, and the trigger circuit may be coupled to the trigger tap of the third ESD clamp through the first NMOS transistor.

In another embodiment, an ESD protection device may be coupled between a first node and a second node. The ESD protection device may include a first ESD clamp, a second ESD clamp, and a third ESD clamp. An anode of the first ESD clamp may be coupled to the first node, a cathode of the third ESD clamp may be coupled to the second node, and the second ESD clamp may be coupled between the first ESD clamp and the third ESD clamp. The ESD protection device may further include a first PNP transistor, wherein an emitter of the first PNP transistor may be coupled to a trigger tap of the first ESD clamp and a collector of the first PNP transistor may be coupled to either a trigger tap of the second ESD clamp or a trigger tap of the third ESD clamp. The ESD protection device may further include a trigger circuit coupled between a base of the first PNP transistor and either the trigger tap of the third ESD clamp or the trigger tap of the second ESD clamp. The trigger circuit may be coupled to a different trigger tap than the collector of the first PNP transistor. The trigger circuit may be configured to conduct current in response to an ESD event.

In another embodiment, the ESD protection device may include a second PNP transistor and a fourth ESD clamp. The fourth ESD clamp may be coupled between either the first ESD clamp and the second ESD clamp or the second ESD clamp and the third ESD clamp. An emitter of the second PNP transistor may be coupled to the emitter of the first PNP transistor, a base of the second PNP transistor may be coupled to the base of the first PNP transistor, and a collector of the second PNP transistor may be coupled to a trigger tap of the fourth ESD clamp.

In another embodiment, the ESD protection device may include a second PNP transistor and a fourth ESD clamp coupled between the second ESD clamp and the third ESD clamp. An emitter of the second PNP transistor may be coupled to the base of the first PNP transistor, a base of the second PNP transistor may be coupled to an anode of the trigger circuit, a collector of the second PNP transistor may be coupled to a trigger tap of the fourth ESD clamp, and the trigger circuit may be coupled to the base of the first PNP transistor through the second PNP transistor.

In another embodiment, the ESD protection device may include a first NPN transistor and a fourth ESD clamp coupled between either the second ESD clamp and the third ESD clamp or the first ESD clamp and the second ESD clamp. The collector of the PNP transistor may be coupled to the trigger tap of the second ESD clamp, a collector of the first NPN transistor may be coupled to a trigger tap of the fourth ESD clamp, an emitter of the first NPN transistor may be coupled to the trigger tap of the third ESD clamp, the trigger circuit may be coupled to the base of the first NPN transistor, and the trigger circuit may be coupled to the trigger tap of the third ESD clamp through the first NPN transistor.

In another embodiment, an ESD protection device may be coupled between a first node and a second node. The ESD protection device may include a first ESD clamp, a second ESD clamp, and a third ESD clamp. An anode of the first ESD clamp may be coupled to the first node, a cathode of the third ESD clamp may be coupled to the second node, and the second ESD clamp may be coupled between the first ESD clamp and the third ESD clamp. The ESD protection device may further include a first NMOS transistor, wherein a source of the first NMOS transistor may be coupled to a trigger tap of the third ESD clamp and a drain of the first NMOS transistor may be coupled to either a trigger tap of the first ESD clamp or a trigger tap of the second ESD clamp. The ESD protection device may further include a first resistor coupled to a gate of the first NMOS transistor. The ESD protection device may further include a trigger circuit coupled between a gate of the first NMOS transistor and either the trigger tap of the second ESD clamp or the trigger tap of the first ESD clamp. The trigger circuit may be coupled to a different trigger tap than the drain of the first NMOS transistor. The trigger circuit may be configured to conduct current in response to an ESD event.

In another embodiment, the ESD protection device may include a second NMOS transistor and a fourth ESD clamp coupled between either the first ESD clamp and the second ESD clamp or the second ESD clamp and the third ESD clamp. A source of the second NMOS transistor may be coupled to the source of the first NMOS transistor, a gate of the second NMOS transistor may be coupled to the gate of the first NMOS transistor, and a drain of the second NMOS transistor may be coupled to a trigger tap of the fourth ESD clamp.

In another embodiment, the ESD protection device may include a second NMOS transistor, a second resistor coupled between a gate of the second NMOS transistor and a source of the second NMOS transistor, and a fourth ESD clamp coupled between the first ESD clamp and the second ESD clamp. The source of the second NMOS transistor may be coupled to the gate of the first NMOS transistor, the gate of the second NMOS transistor may be coupled to a cathode of the trigger circuit, a drain of the second NMOS transistor may be coupled to a trigger tap of the fourth ESD clamp, and the trigger circuit may be coupled to the gate of the first NMOS transistor through the second resistor.

In another embodiment, the first resistor may be coupled between the trigger tap of the third ESD clamp and the gate of the first NMOS transistor.

In another embodiment, the ESD protection device may include a first PMOS transistor, a second resistor, and a fourth ESD clamp coupled between either the second ESD clamp and the third ESD clamp or the first ESD clamp and the second ESD clamp. The drain of the first NMOS transistor may be coupled to the trigger tap of the second ESD clamp, the second resistor may be coupled to a gate of the first PMOS transistor, a drain of the first PMOS transistor may be coupled to a trigger tap of the fourth ESD clamp, a source of the first PMOS transistor may be coupled to the trigger tap of the first ESD clamp, the trigger circuit may be coupled to the gate of the first PMOS transistor, and the trigger circuit may be coupled to the trigger tap of the first ESD clamp through the first PMOS transistor.

In another embodiment, an ESD protection device may be coupled between a first node and a second node. The ESD protection device may include a first ESD clamp, a second ESD clamp, and a third ESD clamp. An anode of the first ESD clamp may be coupled to the first node, a cathode of the third ESD clamp may be coupled to the second node, and the second ESD clamp may be coupled between the first ESD clamp and the third ESD clamp. The ESD protection device may further include a first NPN transistor, wherein an emitter of the first NPN transistor may be coupled to a trigger tap of the third ESD clamp and a collector of the first NPN transistor may be coupled to either a trigger tap of the first ESD clamp or a trigger tap of the second ESD clamp. The ESD protection device may further include a trigger circuit coupled between a base of the first NPN transistor and either the trigger tap of the second ESD clamp or the trigger tap of the first ESD clamp. The trigger circuit may be coupled to a different trigger tap than the collector of the first NPN transistor. The trigger circuit may be configured to conduct current in response to an ESD event.

In another embodiment, the ESD protection device may include a second NPN transistor and a fourth ESD clamp coupled between either the first ESD clamp and the second ESD clamp or the second ESD clamp and the third ESD clamp. An emitter of the second NPN transistor may be coupled to the emitter of the first NPN transistor, a base of the second NPN transistor may be coupled to the base of the first NPN transistor, and a collector of the second NPN transistor may be coupled to a trigger tap of the fourth ESD clamp.

In another embodiment, the ESD protection device may include a second NPN transistor and a fourth ESD clamp coupled between the first ESD clamp and the second ESD clamp. An emitter of the second NPN transistor may be coupled to the base of the first NPN transistor, a base of the second NPN transistor may be coupled to a cathode of the trigger circuit, a collector of the second NPN transistor may be coupled to a trigger tap of the fourth ESD clamp, and the trigger circuit may be coupled to the base of the first NPN transistor through the second NPN transistor.

In another embodiment, the ESD protection device may include a first NPN transistor and a fourth ESD clamp coupled between either the second ESD clamp and the third ESD clamp or the first ESD clamp and the second ESD clamp. The collector of the PNP transistor may be coupled to the trigger tap of the second ESD clamp, a collector of the first NPN transistor may be coupled to a trigger tap of the fourth ESD clamp, an emitter of the first NPN transistor may be coupled to the trigger tap of the third ESD clamp, the trigger circuit may be coupled to the base of the first NPN transistor, and the trigger circuit may be coupled to the trigger tap of the third ESD clamp through the first NPN transistor.

In another embodiment, at least one of the first ESD clamp, the second ESD clamp, or the third ESD clamp may be a silicon controller rectifier (SCR).

In another embodiment, the first ESD clamp, the second ESD clamp, and the third ESD clamp may be configured to shunt current from the first node to the second node in response to the trigger circuit conducting current.

BRIEF DESCRIPTION OF THE DRAWINGS

A more detailed understanding may be had from the following description, given by way of example in conjunction with the accompanying drawings wherein.

DETAILED DESCRIPTION

Figure 1A:
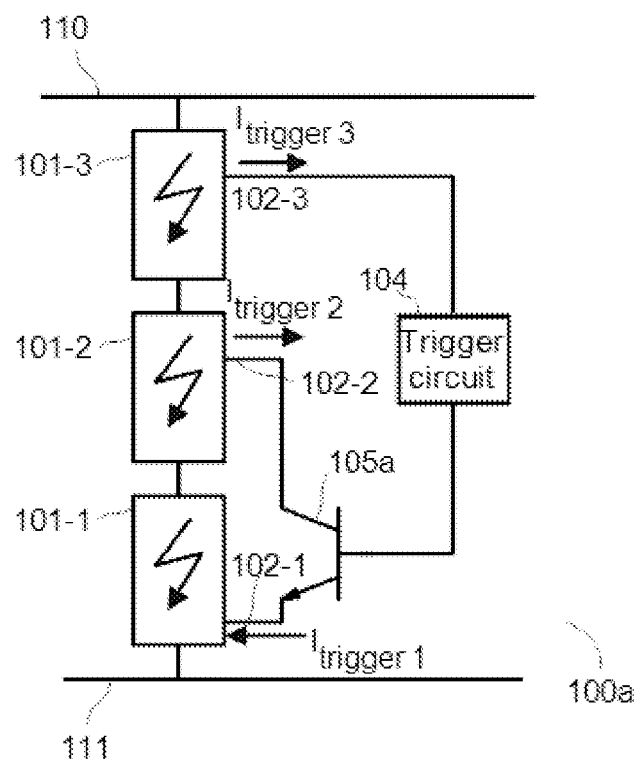
FIG. 1A is a schematic diagram depicting a first example embodiment of an ESD protection device including three ESD clamps.

In the following descriptions, common numerical designations may be used for similar, corresponding parts across multiple figures. In general, the part number will start with the figure number. For instance, NPN transistor 105a in FIG. 1A corresponds to similar NMOS transistor 105b in FIG. 1B, similar PNP transistor 105c in FIG. 1C, similar PMOS transistor 105d in FIG. 1D, and similar NPN transistors 205a-2 and 205a-3 in FIG. 2A.

One of ordinary skill in the art should recognize a node, device, circuit, or region may be viewed as serving multiple functions. Furthermore, a node, device, circuit, or region may be referred to by different descriptions. For instance, first node 110 may also be referred to as the anode of ESD clamp 101-3 in FIGS. 1A and 1B. As another example, a node may have multiple elements coupled to it, and as such, the node may be referred to by multiple different labels. For example, in FIG. 1C, node 102-2 may be referred to as trigger tap 102-2 or may be referred to as the collector of PNP 105c. As another example, an NPN bipolar transistor may be interchangeably referred to as an NPN. The numerical designation will provide an unambiguous notation for the node, device, circuit, or region under consideration while the preceding descriptor should aid the readability of the description in the context of the discussion.

It is further important to note that though the embodiments depicted in the figures and further described in the specification may be with respect to a particular arrangement or configuration of functional elements and/or including or excluding functional elements, one should recognize that the principles of the described and/or depicted embodiment may be applied to other embodiments such that embodiments not explicitly disclosed that are formed by a combination of the principles disclosed herein are within the scope of the description.

In accordance with the embodiments disclosed herein, the area for triggering a stack of multiple ESD clamps may be reduced by sharing a triggering device across the multiple ESD clamps in the stack. Additionally, the triggering of the multiple ESD clamps that share the trigger device may be simultaneous.

FIG. 1A is a schematic diagram depicting a first example embodiment of an ESD protection device 100a. The ESD protection device 100a may include three ESD clamps 101-1, 101-2, and 101-3 coupled in series between a first node 110 and a second node 111, wherein an anode of ESD clamp 101-3 may be coupled to first node 110, a cathode of ESD clamp 101-3 may be coupled to an anode of ESD clamp 101-2, a cathode of ESD clamp 101-2 may be coupled to an anode of ESD clamp 101-1, and a cathode of ESD clamp 101-1 may be coupled to the second node 111. An ESD clamp may be any circuit that may be triggered through a trigger tap to conduct current. Silicon controlled rectifiers (SCRs) may be one example of an ESD clamp. Although the ESD clamps depicted herein are shown with a single trigger tap, an ESD clamp may include multiple trigger taps, any of which may trigger the ESD clamp. MOS or bipolar transistors or a combination thereof may be other examples. A trigger tap may be defined as a node of an ESD clamp which may cause the ESD clamp to enter a conductive state from a non-conductive state when current is supplied to or extracted from the trigger tap. A trigger tap 102-3 of the ESD clamp 101-3 may be coupled to the anode of the trigger circuit 104. A trigger circuit may be any circuit that reacts to an ESD event by shunting an amount of current through a trigger tap of one or more ESD clamps. A trigger circuit may include any combination of forward diodes, reverse diodes, transistors, SCRs, resistances, capacitances, inductances, etc. The cathode of the trigger circuit 104 may be coupled to a base of an NPN bipolar transistor 105a. The emitter of the NPN 105a may be coupled to a trigger tap 102-1 of ESD clamp 101-1. The collector of the NPN 105a may be coupled to a trigger tap 102-2 of ESD clamp 101-2.

Trigger circuit 104 may react to an ESD event and draw current $I_{trigger3}$ from trigger tap 102-3 that may cause ESD clamp 101-3 to trigger, thus entering a conductive state. The trigger current $I_{trigger3}$ may cause current to flow from the base to the emitter of NPN 105a. The emitter current $I_{trigger1}$ may flow into the trigger tap 102-1 of ESD clamp 101-1 triggering ESD clamp 101-1 to enter a conductive state. The base-emitter current of NPN 105a may cause current $I_{trigger2}$ to flow from trigger tap 102-2 of ESD clamp 101-2 through the collector of NPN 105a, causing ESD clamp 101-2 to trigger, thus entering a conductive state. All three ESD clamps 101-1, 101-2, 101-3 may be in a conductive state enabling this stack of ESD clamps to shunt ESD current from node 110 to node 111.

Trigger circuit 104 may determine the trigger voltage of the example embodiment of the ESD protection device 100a. This trigger voltage can be based on a breakdown voltage of a junction. In this case, the breakdown voltage may determine the voltage at which the trigger circuit starts to deliver trigger current. The size of the trigger circuit may determine the maximum current that can be drawn from ESD clamp 101-3.

The amount of trigger current drawn from ESD clamp 101-2 and delivered to ESD clamp 101-1 may be determined by two elements: the amount of current through the trigger circuit 104 and the NPN 105a. The trigger current through trigger circuit 104, which may be delivered to the base of NPN 105a, may be multiplied by one plus the beta of the NPN 105a, and delivered from the emitter of NPN 105a to the trigger tap 102-1 of ESD clamp 101-1. $I_{trigger2}$ drawn from the trigger tap 102-2 of ESD clamp 101-2 may be beta times $I_{trigger3}$, which is the current through the trigger circuit 104. Tuning of the beta of the NPN 105a may determine trigger currents $I_{trigger1}$ and $I_{trigger2}$. Thus, current distribution of the trigger currents for ESD clamps 101-1, 101-2, and 101-3 may be adjusted by sizing the trigger circuit 104 in combination with tuning beta of the NPN 105a.

Figure 1B:
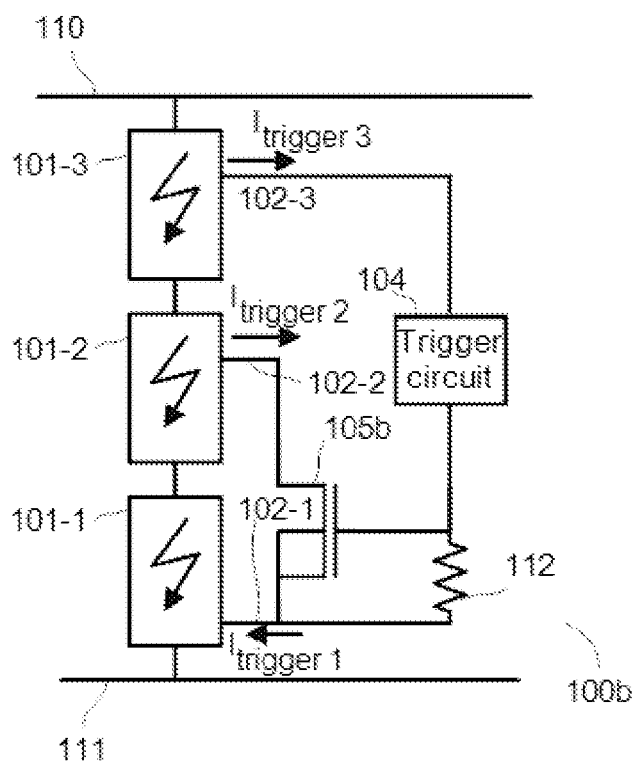
FIG. 1B is a schematic diagram depicting a second example embodiment of an ESD protection device including three ESD clamps.

FIG. 1B is a schematic diagram depicting a second example embodiment of an ESD protection device 100b, wherein NPN 105a from FIG. 1A is replaced by an NMOS 105b and an additional resistor 112 coupled between a gate and source of NMOS 105b. Resistor 112, as well as any of the other resistors depicted and described herein, may be an explicit resistor or may be implemented as another resistive element or a device that exhibits a desired resistance. Note that a resistor may similarly be coupled between the base and emitter of NPN 105a in FIG. 1A. Resistor 112 may provide a current path for the trigger current $I_{trigger3}$ flowing through trigger circuit 104 to node 111 and as such may provide a bias voltage between the gate and source of NMOS 105b. The bias voltage may turn on NMOS 105b creating a conductive path between trigger tap 102-2 of ESD clamp 101-2 and trigger tap 102-1 of ESD clamp 101-1. Turning on NMOS 105b may cause current $I_{trigger2}$ to be drawn from trigger tap 102-2 and may deliver current $I_{trigger1}$ to trigger tap 102-1. The combination of the trigger current $I_{trigger3}$ from trigger circuit 104, current $I_{trigger2}$, and current $I_{trigger1}$ may trigger ESD clamps 101-1, 101-2, and 101-3 to enter a conductive state and shunt ESD current from node 110 to node 111.

A size of the trigger circuit 104, a size of NMOS 105b, a transconductance of 105b, a threshold voltage of NMOS 105b, and a size of resistor 112 may be used to adjust the levels of currents $I_{trigger1}$, $I_{trigger2}$, and $I_{trigger3}$.

Figure 1C:
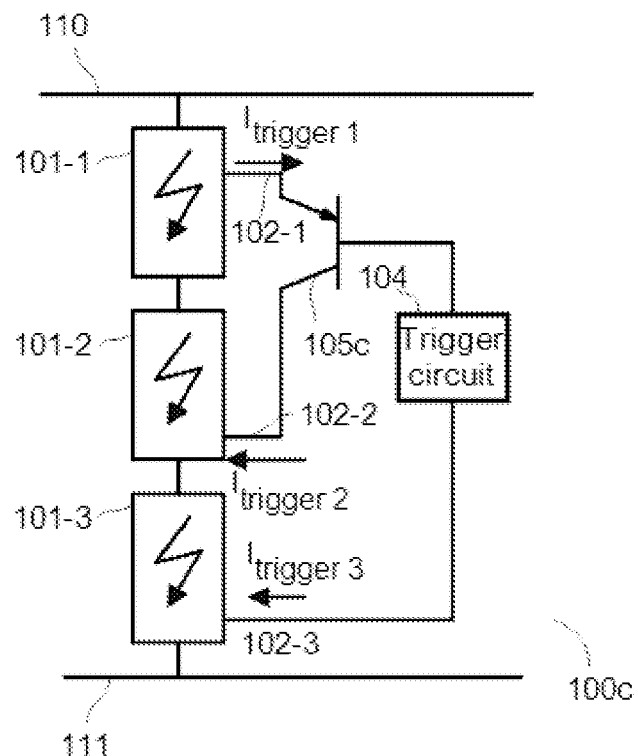
FIG. 1C is a schematic diagram depicting a third example embodiment of an ESD protection device including three ESD clamps.

FIG. 1C is a schematic diagram depicting a third example embodiment of an ESD protection device 100c. A trigger tap 102-1 of the ESD clamp 101-1 may be coupled to the emitter of PNP bipolar transistor 105c. The base of PNP 105c may be coupled to the anode of trigger circuit 104. The collector of PNP 105c may be coupled to trigger tap 102-2 of ESD clamp 101-2. The cathode of the trigger circuit 104 may be coupled to trigger tap 102-3 of ESD clamp 101-3. When trigger circuit 104 triggers due to an ESD event, the emitter-base current of PNP 105c may draw current $I_{trigger1}$ from trigger tap 102-1 of ESD clamp 101-1, which may trigger ESD clamp 101-1 into a conductive state. With the PNP 105c in a conductive state, collector current $I_{trigger2}$ may be delivered into the trigger tap 102-2 of ESD clamp 101-2, which may trigger ESD clamp 101-2 into a conductive state. The current $I_{trigger3}$ flowing through trigger circuit 104 may flow into trigger tap 102-3 of ESD clamp 101-3, which may trigger ESD clamp 101-3 into a conductive state. Similarly as for the embodiment of the ESD protection device 100a depicted in FIG. 1A, the size of the trigger circuit 104 and the beta of the PNP 105c may be tuned to adjust the values of $I_{trigger1}$, $I_{trigger2}$, and $I_{trigger3}$.

Figure 1D:
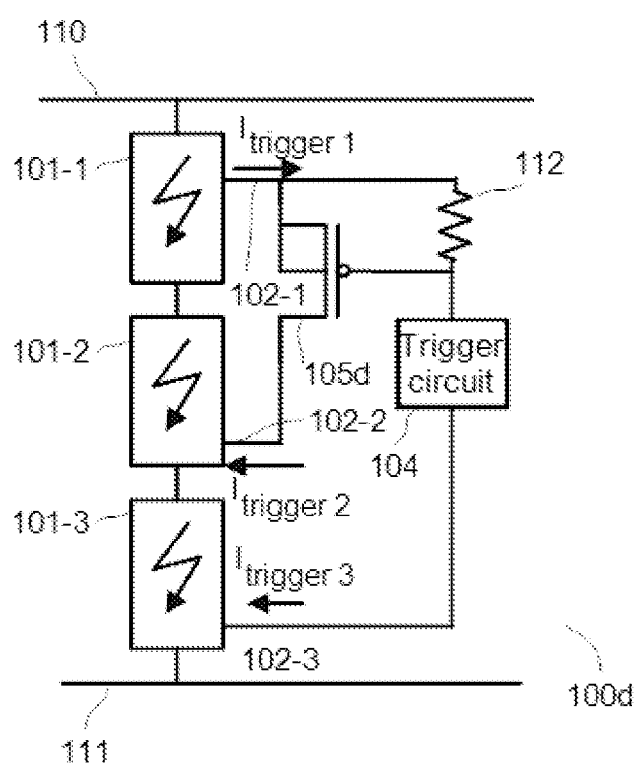
FIG. 1D is a schematic diagram depicting a fourth example embodiment of an ESD protection device including three ESD clamps.

FIG. 1D is a schematic diagram depicting a fourth example embodiment of an ESD protection device 100d, wherein PNP 105c from FIG. 1C is replaced by a PMOS 105d and an additional resistor 112 coupled between a gate and source of PMOS 105d. Note that a resistor may similarly be coupled between the base and emitter of PNP 105c in FIG. 1C. Resistor 112 may provide a current path for the trigger current flowing through trigger circuit 104, $I_{trigger3}$, from node 110 and as such may provide a bias voltage to the gate of PMOS 105d. The bias voltage may turn on PMOS 105d creating a conductive path between trigger tap 102-1 of ESD clamp 101-1 and trigger tap 102-2 of ESD clamp 101-2. Turning on PMOS 105d may cause current $I_{trigger2}$ to be provided to trigger tap 102-2 and may draw current $I_{trigger1}$ from trigger tap 102-1. The combination of the trigger current $I_{trigger3}$ from trigger circuit 104, current $I_{trigger2}$, and current $I_{trigger1}$ may trigger ESD clamps 101-1, 101-2, and 101-3 to enter a conductive state and shunt ESD current from node 110 to node 111.

Figure 2A:
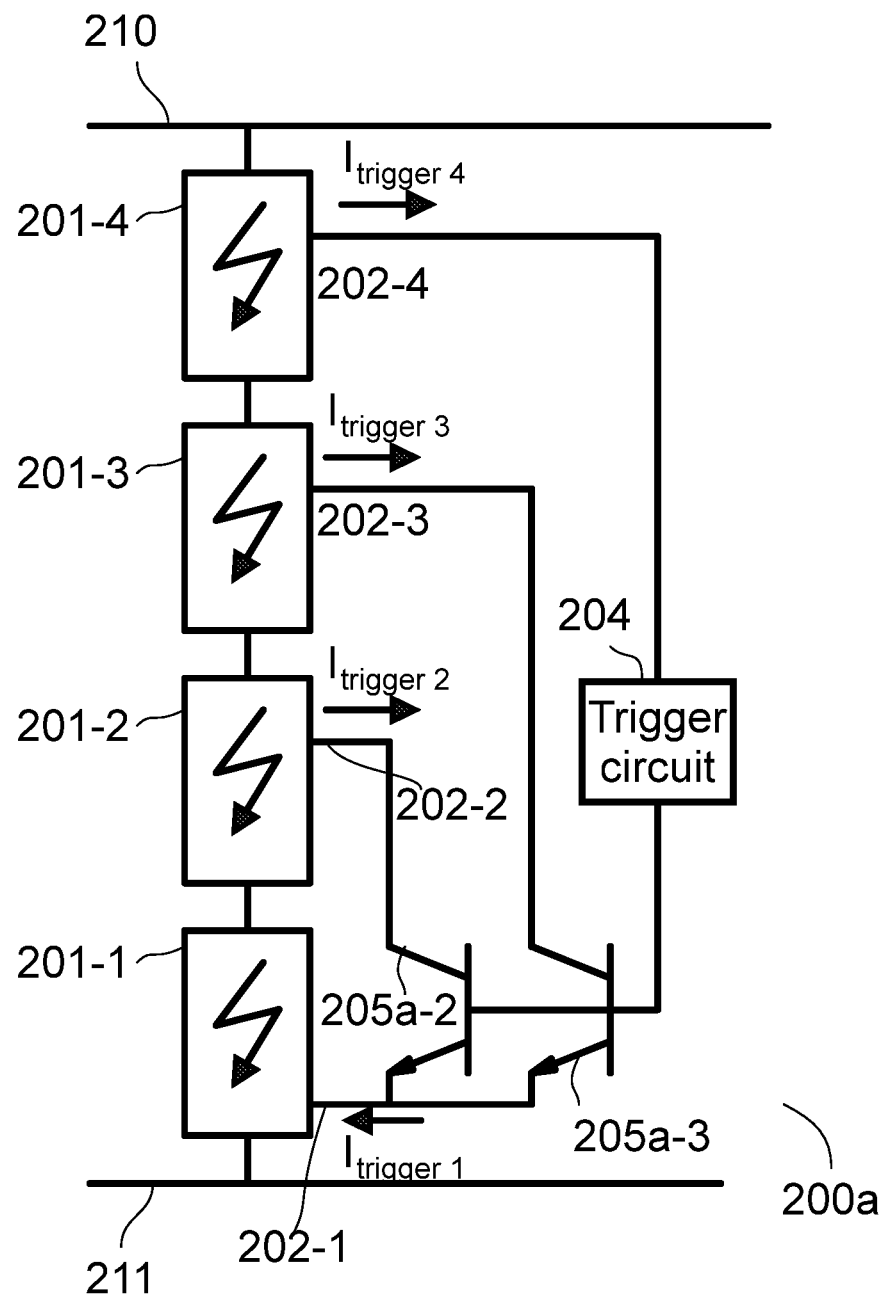
FIG. 2A is a schematic diagram depicting a first example embodiment of an ESD protection device including four ESD clamps.
Figure 2B:
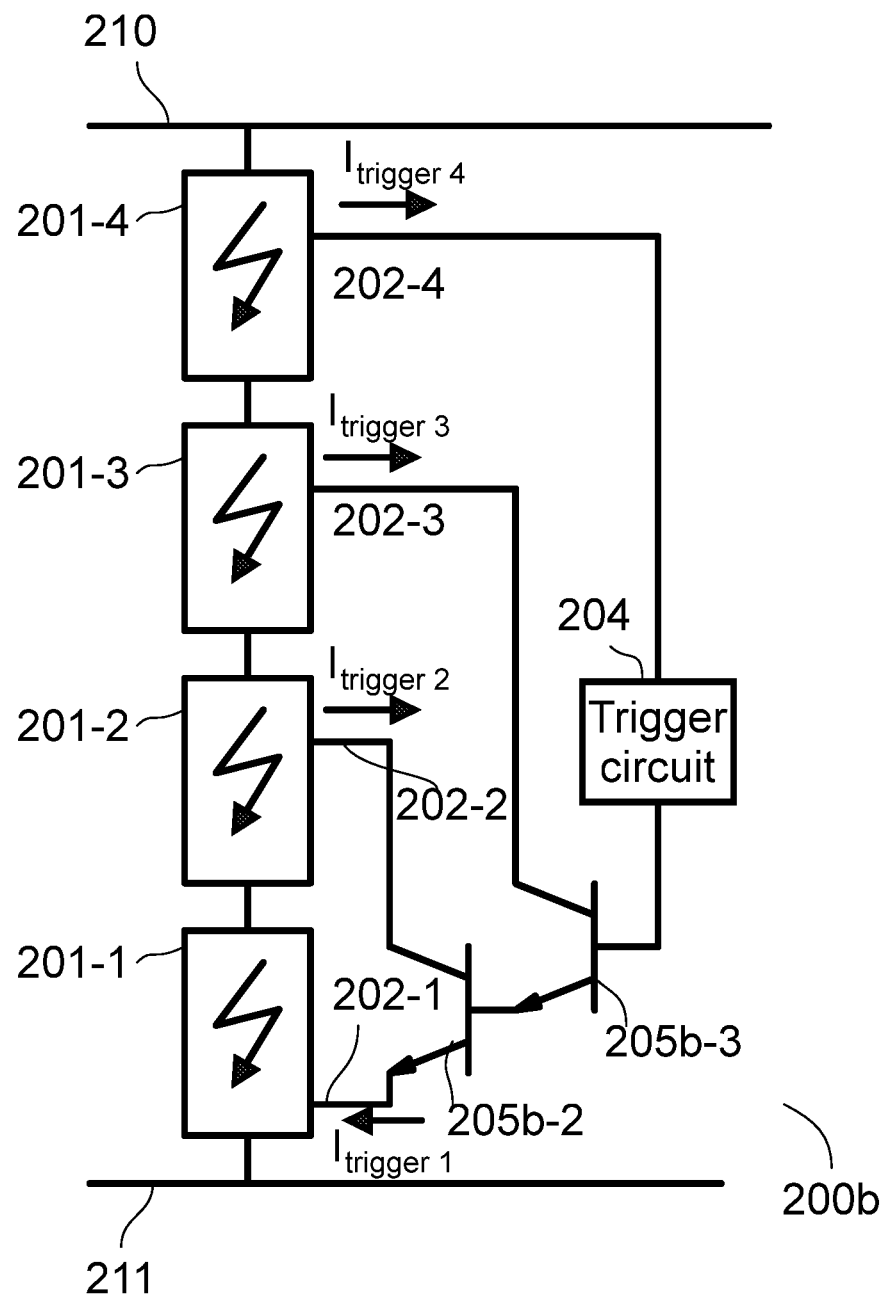
FIG. 2B is a schematic diagram depicting a second example embodiment of an ESD protection device including four ESD clamps.

FIGS. 2A and 2B are schematic diagrams depicting more example embodiments of an ESD protection device 200a and 200b including four ESD clamps 201-1, 201-2, 201-3, and 201-4.

As depicted in FIG. 2A, NPN 205a-2 and NPN 205a-3 may share the same node for their emitters and may also share the same node for their bases. In other embodiments, NPN 205a-2 and NPN 205a-3 may be merged into a single merged device such that they use the same base and emitter but the merged device includes two separate collectors. The collector of NPN 205a-2 may be coupled to trigger tap 202-2 of ESD clamp 201-2 and the collector of NPN 205a-3 may be coupled to trigger tap 202-3 of ESD clamp 201-3. The emitters of NPN 205a-2 and NPN 205a-3 may be coupled to trigger tap 202-1 of ESD clamp 201-1 and the bases of NPN 205a-2 and NPN 205a-3 may be coupled to the cathode of trigger circuit 204. The anode of trigger circuit 204 may be coupled to trigger tap 202-4 of ESD clamp 201-4. When trigger circuit 204 triggers due to an ESD event, the current $I_{trigger4}$ through the trigger circuit 204 may trigger ESD clamp 201-4. Further, the current $I_{trigger4}$ may turn on NPNs 205a-2 and 205a-3. As a result, current $I_{trigger1}$ may flow into trigger tap 202-1 of ESD clamp 201-1 triggering ESD clamp 201-1 to enter a conductive state, and currents $I_{trigger2}$ and $I_{trigger3}$ may be drawn from trigger taps 202-2 and 202-3, respectively, triggering ESD clamps 201-2 and 201-3 to enter into a conductive state. Thus, all ESD clamps 201-1, 201-2, 201-3, and 201-4 may enter into a conductive state in response to the ESD event and may shunt ESD current from node 210 to node 211.

In FIG. 2B, instead of the NPNs sharing the same node for their emitters and also sharing the same node for their bases, the base of NPN 205b-2 may be coupled to the emitter of NPN 205b-3 and the base of NPN 205b-3 may be coupled to the cathode of trigger circuit 204. Similar to the example embodiment of an ESD protection device 200a in FIG. 2A, when the trigger circuit 204 triggers in response to an ESD event, current $I_{trigger4}$ may be drawn from trigger tap 202-4 and trigger ESD clamp 201-4 to enter into a conductive state and NPNs 205b-2 and 205b-3 may turn on. Current $I_{trigger4}$ flowing through the trigger circuit 204 may flow into the base of NPN 205b-3 turning on NPN 205b-3 and generating an emitter current that may flow into the base of NPN 205b-2 turning on NPN 205b-2 and generating an emitter current $I_{trigger1}$ that may flow into trigger tap 202-1 of ESD clamp 201-1 and trigger it into a conductive state. Again, similar to the example embodiment of the ESD protection device 200a in FIG. 2A, with NPNs 205b-2 and 205b-3 turned on, their respective collector currents $I_{trigger2}$ and $I_{trigger3}$ may be drawn from trigger taps 202-2 and 202-3, respectively, triggering ESD clamps 201-2 and 201-3 to enter into a conductive state. Thus, all ESD clamps 201-1, 201-2, 201-3, and 201-4 may enter into a conductive state in response to the ESD event and may shunt ESD current from node 210 to node 211.

Figure 2C:
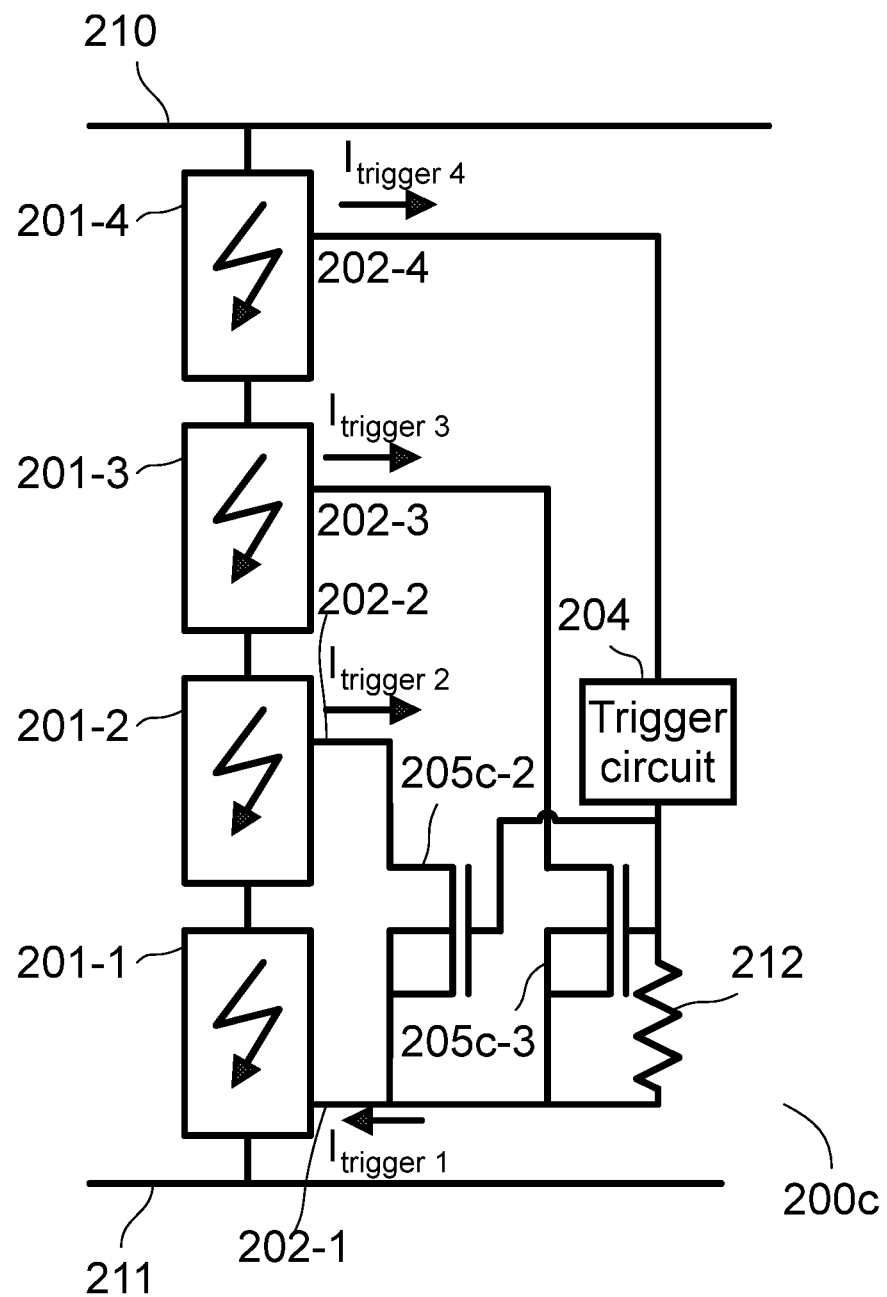
FIG. 2C is a schematic diagram depicting a third example embodiment of an ESD protection device including four ESD clamps.
Figure 2D:
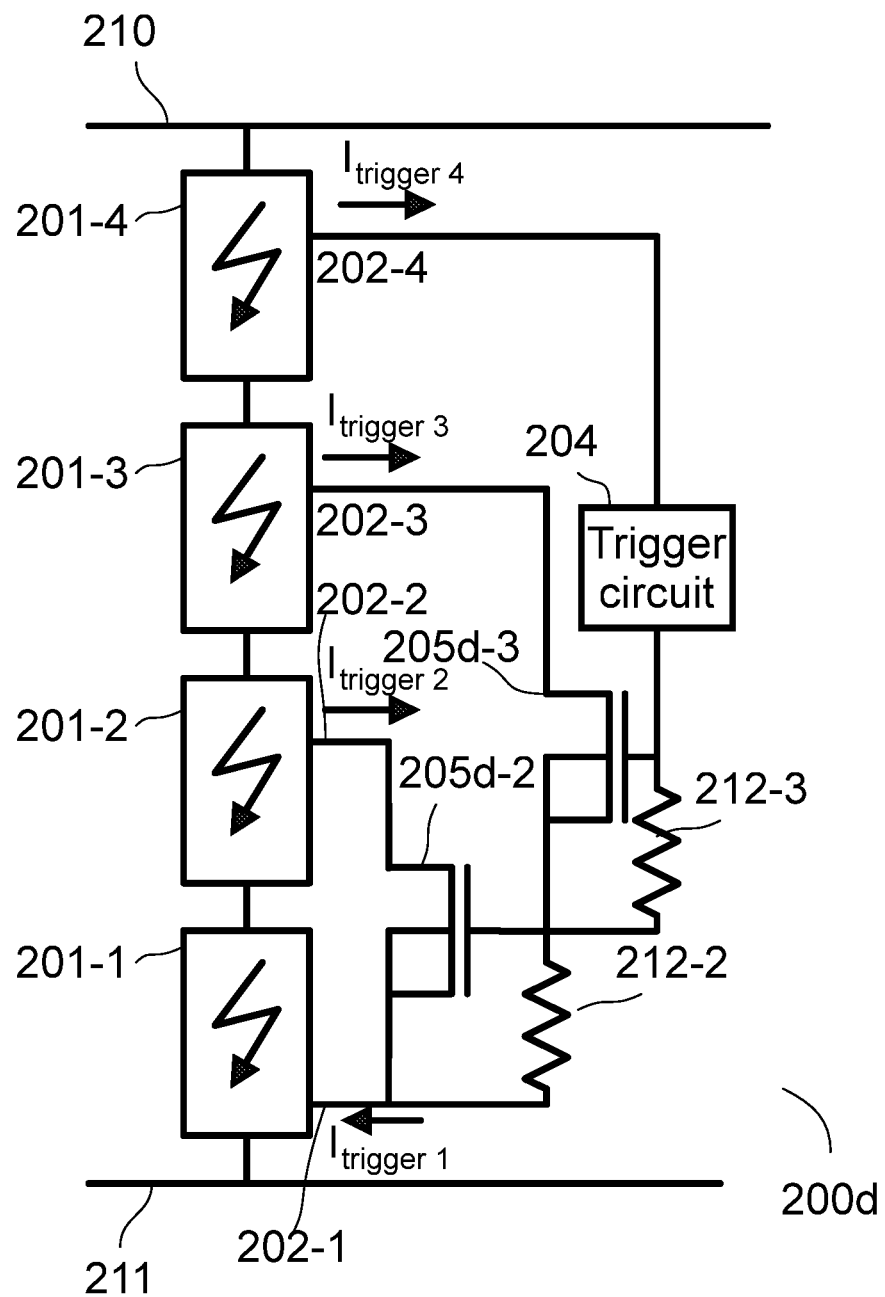
FIG. 2D is a schematic diagram depicting a fourth example embodiment of an ESD protection device including four ESD clamps.

FIGS. 2C and 2D are schematic diagrams depicting more example embodiments of an ESD protection device 200c and 200d including four ESD clamps 201-1, 201-2, 201-3, and 201-4.

The example embodiment of the ESD protection device 200c in FIG. 2C is similar to the example embodiment 200a depicted in FIG. 2A, wherein NMOSs 205c-2 and 205c-3 and an additional resistor 212 replace NPNs 205a-2 and 205a-3 from FIG. 2A. Similar to the bases of NPNs 205a-2 and 205a-3 depicted in FIG. 2A, the gates of NMOSs 205c-2 and 205c-3 may share a same node and the sources of NMOSs 205c-2 and 205c-3 may share a same node. In other embodiments, NMOS 205c-2 and NMOS 205c-3 may be merged into a single merged device such that they use the same gate and source but the merged device includes two separate drains. Note that a resistor may similarly be coupled between the bases and emitters of NPNs 205a-2 and 205a-3 in FIG. 2A. Resistor 212 may provide a current path for the trigger current flowing through trigger circuit 204, $I_{trigger4}$, to node 211 and as such may provide a bias voltage to the gates of NMOSs 205c-2 and 205c-3. The bias voltage may turn on NMOSs 205c-2 and 205c-3. Turning on NMOSs 205c-2 and 205c-3 may cause currents $I_{trigger2}$ and $I_{trigger3}$ to be drawn from trigger taps 202-2 and 202-3, respectively, and may deliver current $I_{trigger1}$ to trigger tap 202-1. The trigger current $I_{trigger4}$ from trigger circuit 204, current $I_{trigger3}$, current $I_{trigger2}$, and current $I_{trigger1}$ may trigger ESD clamps 201-4, 201-3, 201-2, and 201-1 to enter a conductive state and shunt ESD current from node 210 to node 211.

The example embodiment of the ESD protection device 200d in FIG. 2D is similar to the example embodiment 200b depicted in FIG. 2B, wherein NMOSs 205d-2 and 205d-3 and additional resistors 212-2 and 212-3 replace NPNs 205b-2 and 205b-3 from FIG. 2B. Resistor 212-2 may be coupled between the source and gate of NMOS 205d-2 and resistor 212-3 may be coupled between the source and gate of NMOS 205d-3. Similar to the NPNs 205b-2 and 205b-3 depicted in FIG. 2B, the gate of NMOS 205d-2 may be coupled to the source of NMOS 205d-3 and the gate of NMOS 205d-3 may be coupled to the cathode of trigger circuit 204. Note that a resistor may similarly be coupled between the base and emitter of NPN 205b-2 and a resistor may be coupled between the base and emitter of NPN 205b-3 in FIG. 2B. Resistors 212-2 and 212-3 may provide a current path for the trigger current flowing through trigger circuit 204, $I_{trigger4}$, to node 211 and as such may each provide respective bias voltages to the gates of NMOSs 205d-2 and 205d-3. The bias voltages may turn on NMOSs 205d-2 and 205d-3. Turning on NMOSs 205d-2 and 205d-3 may cause currents $I_{trigger2}$ and $I_{trigger3}$ to be drawn from trigger taps 202-2 and 202-3, respectively. NMOS 205d-2 may deliver current $I_{trigger1}$ to trigger tap 202-1. The trigger current $I_{trigger4}$ from trigger circuit 204, current $I_{trigger3}$, current $I_{trigger2}$, and current $I_{trigger1}$ may trigger ESD clamps 201-4, 201-3, 201-2, and 201-1 to enter a conductive state and shunt ESD current from node 210 to node 211.

As described above, FIGS. 1A and 1B are schematic diagrams depicting example embodiments of an ESD protection device 100a and 100b including a stack of three ESD clamps. As further described above, FIGS. 2A-2D are schematic diagrams depicting example embodiments of an ESD protection device 200a-200d including a stack of four ESD clamps. Although these example embodiments are depicted and described with stacks of three or four ESD clamps, the teachings disclosed herein may extend to embodiments wherein the stacks include any number of ESD clamps three or greater. To demonstrate these teachings, FIGS. 3A-3D are schematic diagrams depicting example embodiments of ESD protection devices showing how additional ESD clamps and corresponding transistors may be added. Although FIGS. 3A-3D depict a single additional ESD clamp 301-i and a single additional transistor 305a-i-305d-i, any additional number of ESD clamps and corresponding transistors may be added. Thus, in connection with FIGS. 3A-3D, i=3, . . . , n−2, and n>=5. For example in FIG. 3A, for an example embodiment with a stack of n=6 ESD clamps, there would be two additional ESD clamps 301-i and two additional NPNs 305a-i, wherein i=3 and i=4.

Figure 3A:
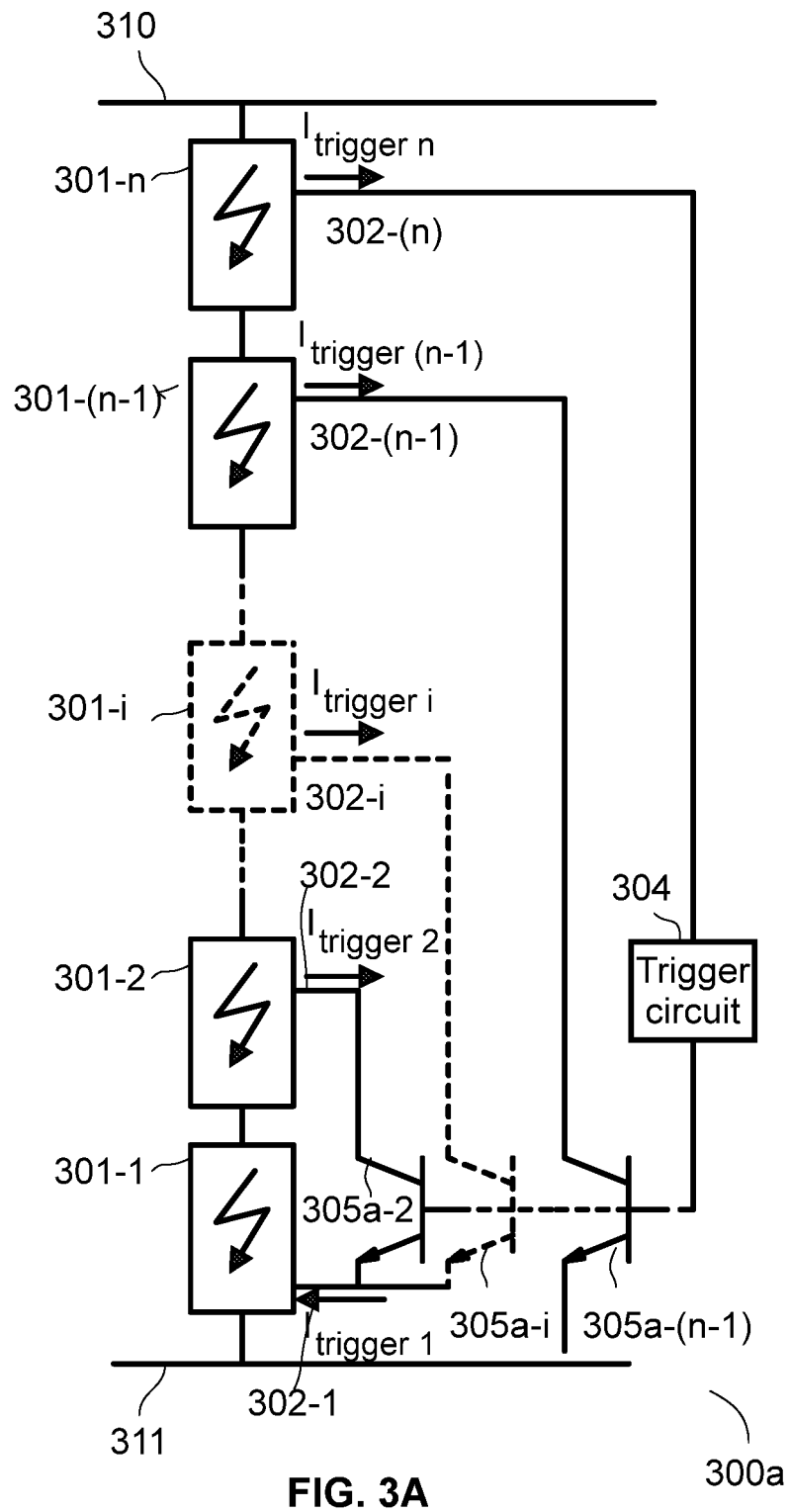
FIG. 3A is a schematic diagram depicting a first example embodiment of an ESD protection device including five or more ESD clamps.

FIG. 3A is a schematic diagram depicting an example embodiment of an ESD protection device 300a including any number of multiple additional ESD clamps 301-i and a corresponding number of NPNs 305a-i. The example embodiment 300a depicted in FIG. 3A is similar to the example embodiment 200a depicted in FIG. 2A, and one of ordinary skill in the art would recognize that similar principles as set forth above for FIG. 2A also apply to FIG. 3A. Although FIG. 3A depicts separate NPNs 305a-2-305a-(n−1), these NPNs may be merged into a single merged device such that they use the same base and emitter but the merged device includes separate collectors for drawing trigger currents $I_{trigger\ 2}$-$I_{trigger\ n-1}$.

Figure 3B:
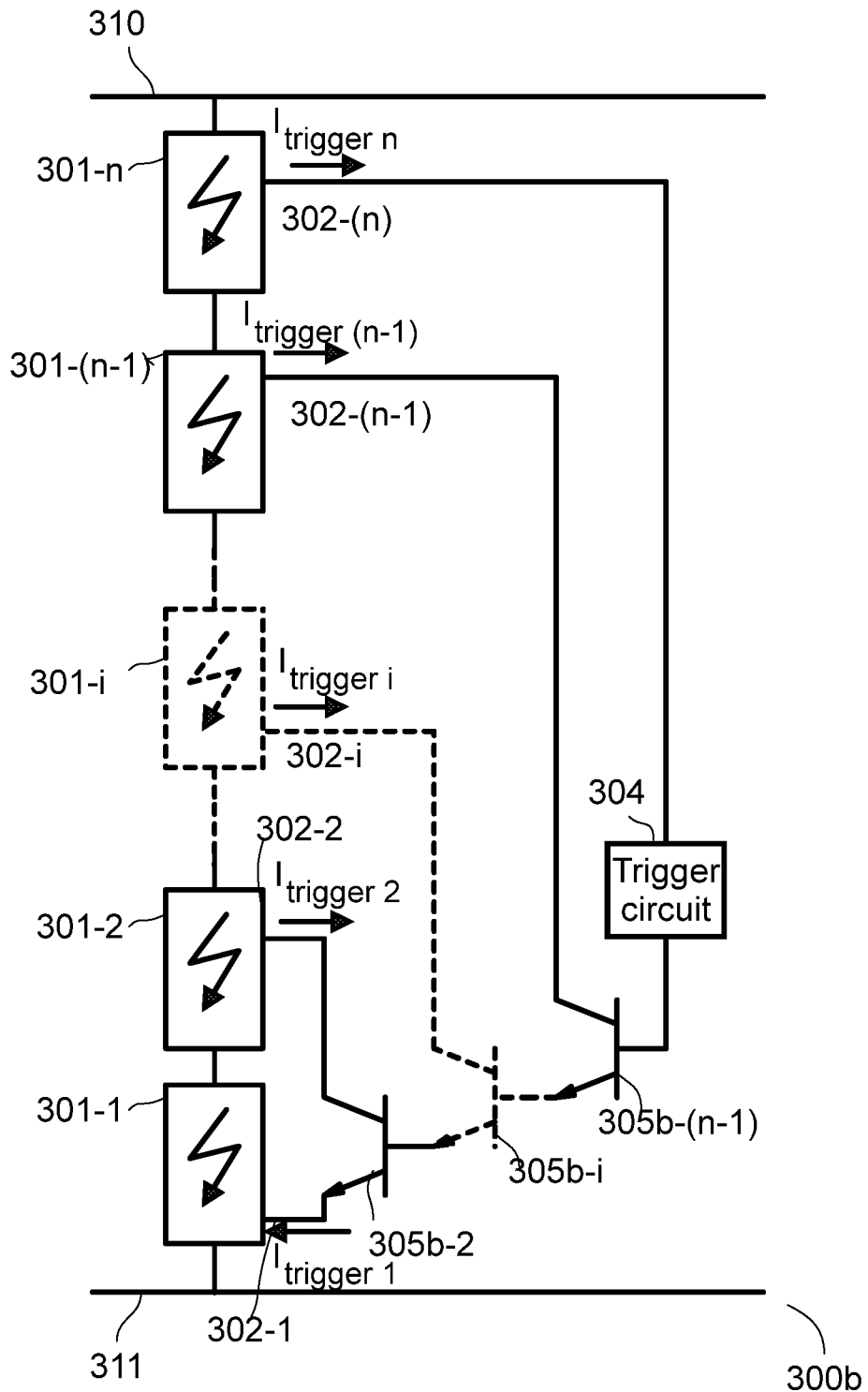
FIG. 3B is a schematic diagram depicting a second example embodiment of an ESD protection device including five or more ESD clamps.

FIG. 3B is a schematic diagram depicting an example embodiment of an ESD protection device 300b including any number of multiple additional ESD clamps 301-i and a corresponding number of NPNs 305b-i. The example embodiment 300b depicted in FIG. 3B is similar to the example embodiment 200b depicted in FIG. 2B, and one of ordinary skill in the art would recognize that similar principles as set forth above for FIG. 2B also apply to FIG. 3B.

Figure 3C:
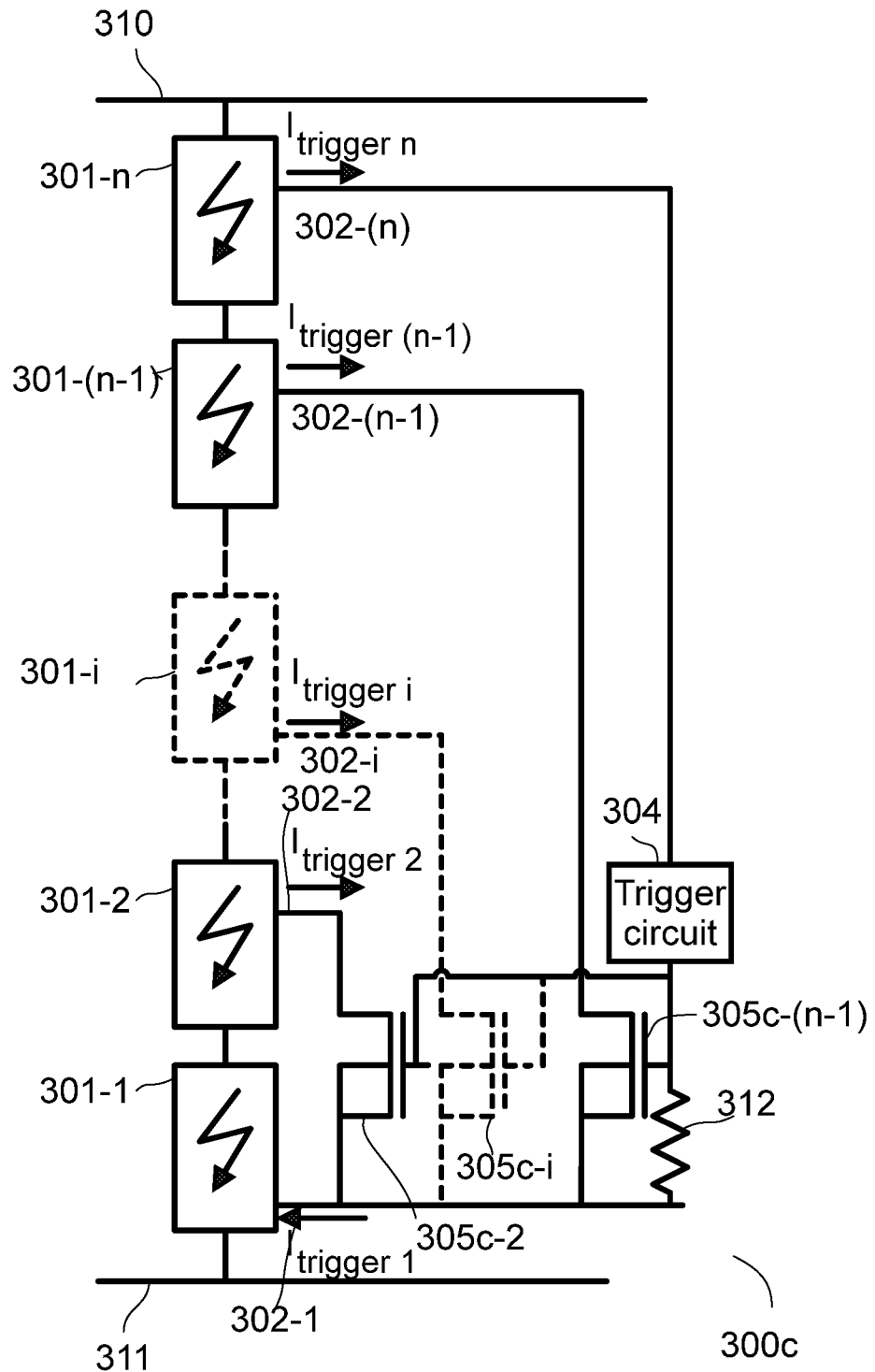
FIG. 3C is a schematic diagram depicting a third example embodiment of an ESD protection device including five or more ESD clamps.

FIG. 3C is a schematic diagram depicting an example embodiment of an ESD protection device 300c including any number of multiple additional ESD clamps 301-i and a corresponding number of NMOSs 305c-i. The example embodiment 300c depicted in FIG. 3C is similar to the example embodiment 200c depicted in FIG. 2C, and one of ordinary skill in the art would recognize that similar principles as set forth above for FIG. 2C also apply to FIG. 3C. Although FIG. 3C depicts separate NMOSs 305c-2-305c-(n−1), these NMOSs may be merged into a single merged device such that they use the same gate and source but the merged device includes separate drains for drawing trigger currents $I_{trigger\ 2}$-$I_{trigger\ n-1}$.

Figure 3D:
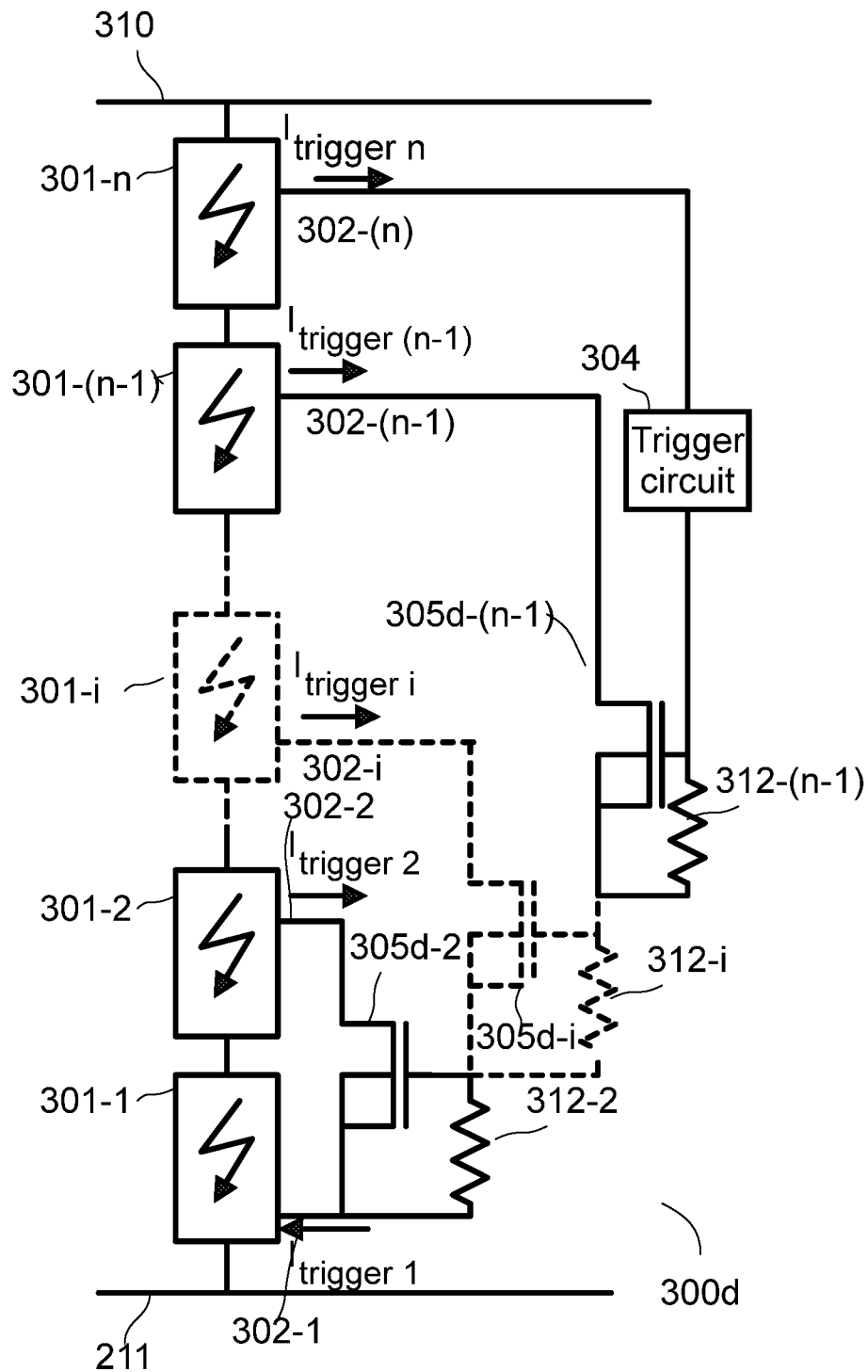
FIG. 3D is a schematic diagram depicting a fourth example embodiment of an ESD protection device including five or more ESD clamps.

FIG. 3D is a schematic diagram depicting an example embodiment of an ESD protection device 300d including any number of multiple additional ESD clamps 301-i and a corresponding number of NMOSs 305d-i and additional resistors 312-i. The example embodiment 300d depicted in FIG. 3D is similar to the example embodiment 200d depicted in FIG. 2D, and one of ordinary skill in the art would recognize that similar principles as set forth above for FIG. 2D also apply to FIG. 3D.

Figure 4A:
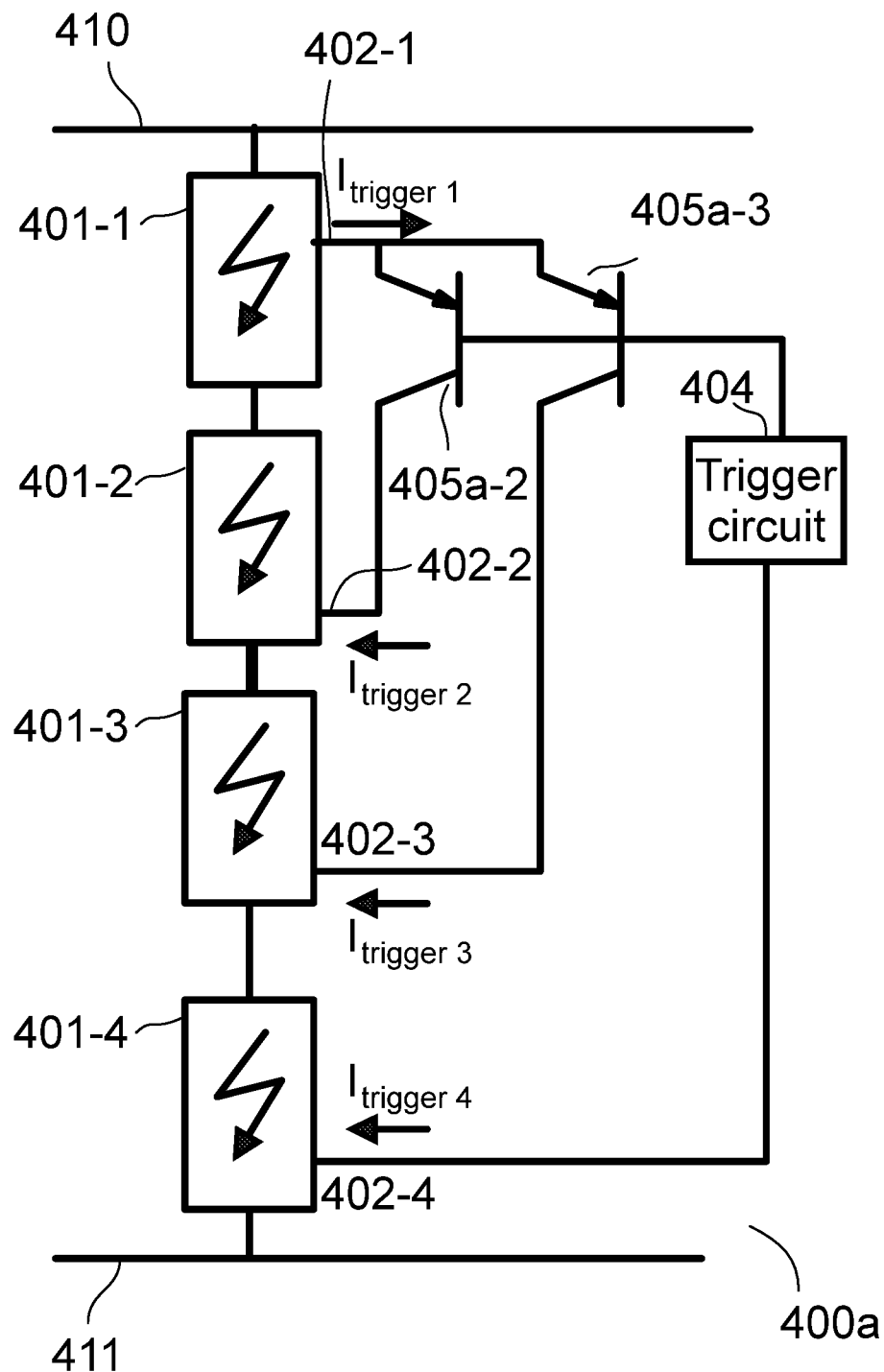
FIG. 4A is a schematic diagram depicting a fifth example embodiment of an ESD protection device including four ESD clamps.
Figure 4B:
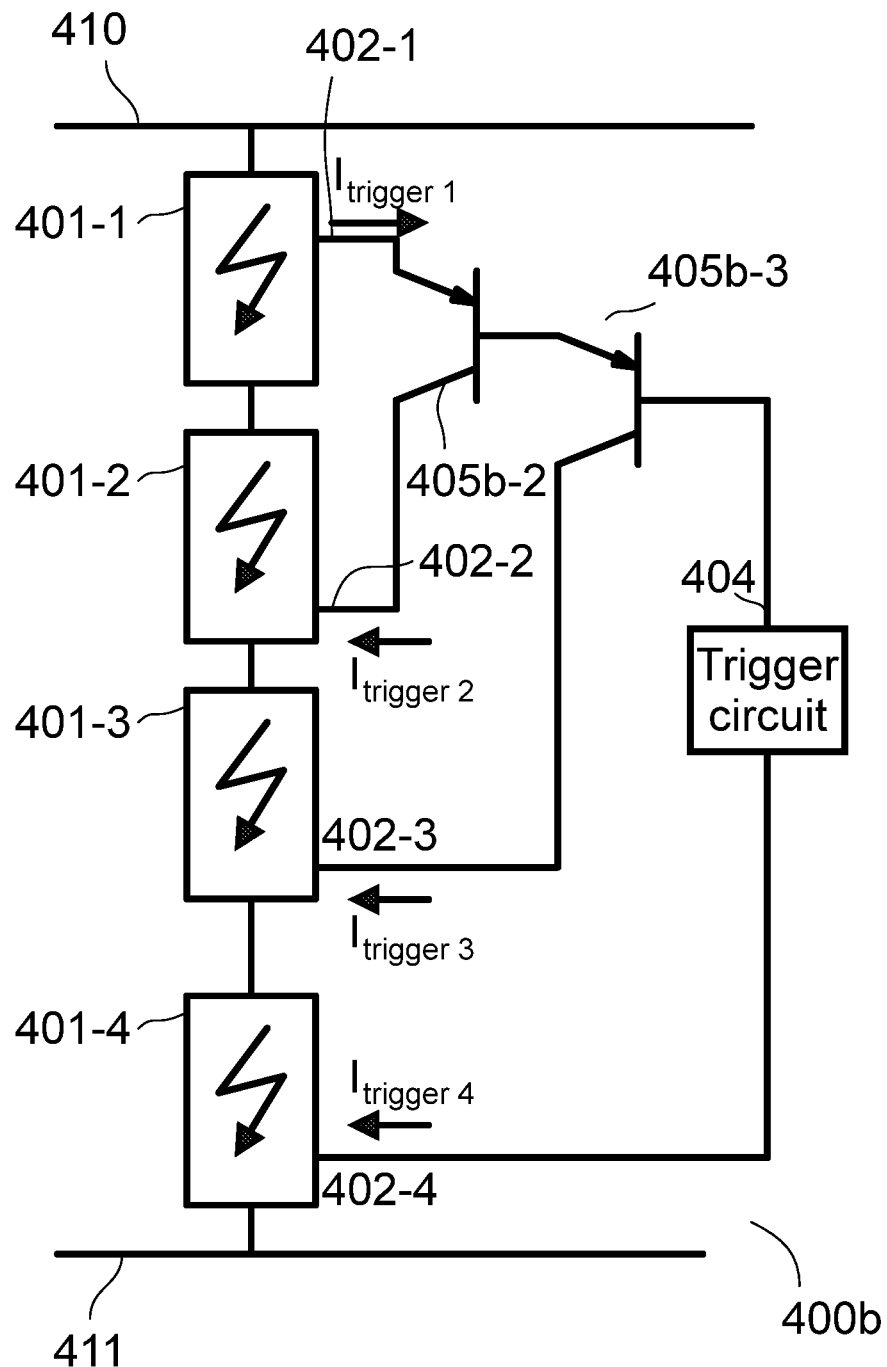
FIG. 4B is a schematic diagram depicting a sixth example embodiment of an ESD protection device including four ESD clamps.

FIGS. 4A and 4B are schematic diagrams depicting more example embodiments of an ESD protection device 400a and 400b including four ESD clamps 401-1, 401-2, 401-3, and 401-4. FIGS. 4A and 4B are similar to FIG. 1C. In FIG. 4A, PNP 405a-2 and PNP 405a-3 may replace PNP 105c from FIG. 1C. In FIG. 4B, PNP 405b-2 and PNP 405b-3 may replace PNP 105c from FIG. 1C.

As depicted in FIG. 4A, PNP 405a-2 and PNP 405a-3 may share the same node for their emitters and may also share the same node for their bases. In other embodiments, PNP 405a-2 and PNP 405a-3 may be merged into a single merged device such that they use the same base and emitter but the merged device includes two separate collectors. The collector of PNP 405a-2 may be coupled to trigger tap 402-2 of ESD clamp 401-2 and the collector of PNP 405a-3 may be coupled to trigger tap 402-3 of ESD clamp 401-3. The emitters of PNP 405a-2 and PNP 405a-3 may be coupled to trigger tap 402-1 of ESD clamp 401-1 and the bases of PNP 405a-2 and PNP 405a-3 may be coupled to the anode of trigger circuit 404. The cathode of trigger circuit 404 may be coupled to trigger tap 402-4 of ESD clamp 401-4. When trigger circuit 404 triggers due to an ESD event, the current $I_{trigger4}$ through the trigger circuit 404 may flow into trigger tap 402-4 and trigger ESD clamp 401-4 to enter into a conductive state. Further, the current $I_{trigger4}$ may turn on PNPs 405a-2 and 405a-3. As a result, current $I_{trigger1}$ may be drawn from trigger tap 402-1 of ESD clamp 401-1 triggering ESD clamp 401-1 to enter a conductive state, and currents $I_{trigger2}$ and $I_{trigger3}$ may flow into trigger taps 402-2 and 402-3, respectively, triggering ESD clamps 401-2 and 401-3 to enter into a conductive state. Thus, all ESD clamps 401-1, 401-2, 401-3, and 401-4 may enter into a conductive state in response to the ESD event and may shunt ESD current from node 410 to node 411.

In FIG. 4B, instead of the PNPs sharing the same node for their emitters and also sharing the same node for their bases, the base of PNP 405b-2 may be coupled to the emitter of PNP 405b-3 and the base of PNP 405b-3 may be coupled to the anode of trigger circuit 404. Similar to the example embodiment of the ESD protection device 400a in FIG. 4A, when the trigger circuit 404 triggers in response to an ESD event, current $I_{trigger4}$ may flow into trigger tap 402-4 and trigger ESD clamp 401-4 to enter into a conductive state, and PNPs 405b-2 and 405b-3 may turn on. Current $I_{trigger4}$ flowing through the trigger circuit 404 may be drawn from the base of PNP 405b-3 turning on PNP 405b-3 and generating an emitter current that may be drawn from the base of PNP 405b-2 turning on PNP 405b-2 and generating an emitter current $I_{trigger1}$ that may be drawn from trigger tap 402-1 of ESD clamp 401-1 and trigger it into a conductive state. Again, similar to the example embodiment of the ESD protection device 400a in FIG. 4A, with PNPs 405b-2 and 405b-3 turned on, their respective collector currents $I_{trigger2}$ and $I_{trigger3}$ may flow into trigger taps 402-2 and 402-3, respectively, triggering ESD clamps 401-2 and 401-3 to enter into a conductive state. Thus, all ESD clamps 401-1, 401-2, 401-3, and 401-4 may enter into a conductive state in response to the ESD event and may shunt ESD current from node 410 to node 411.

Figure 4C:
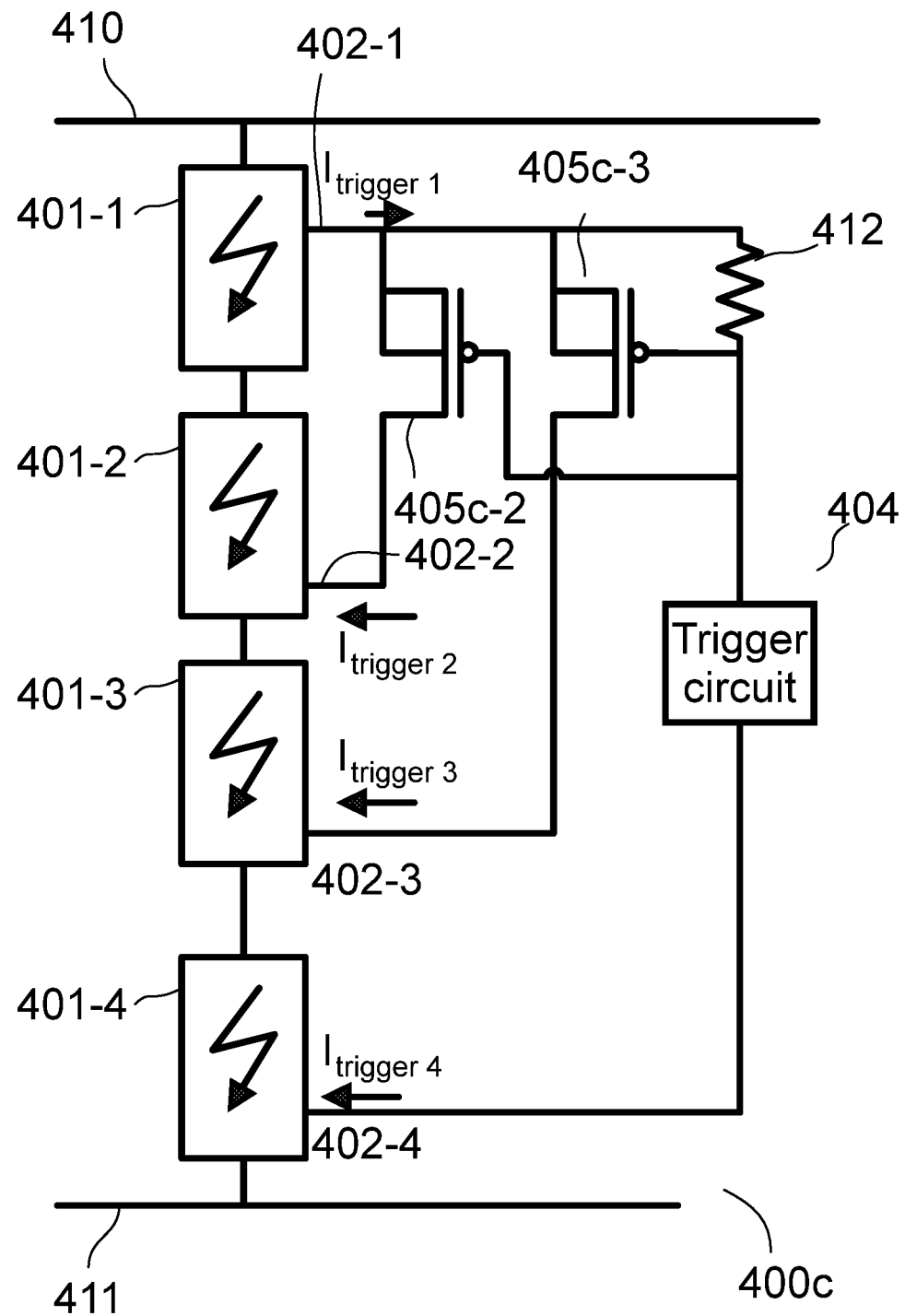
FIG. 4C is a schematic diagram depicting a seventh example embodiment of an ESD protection device including four ESD clamps.
Figure 4D:
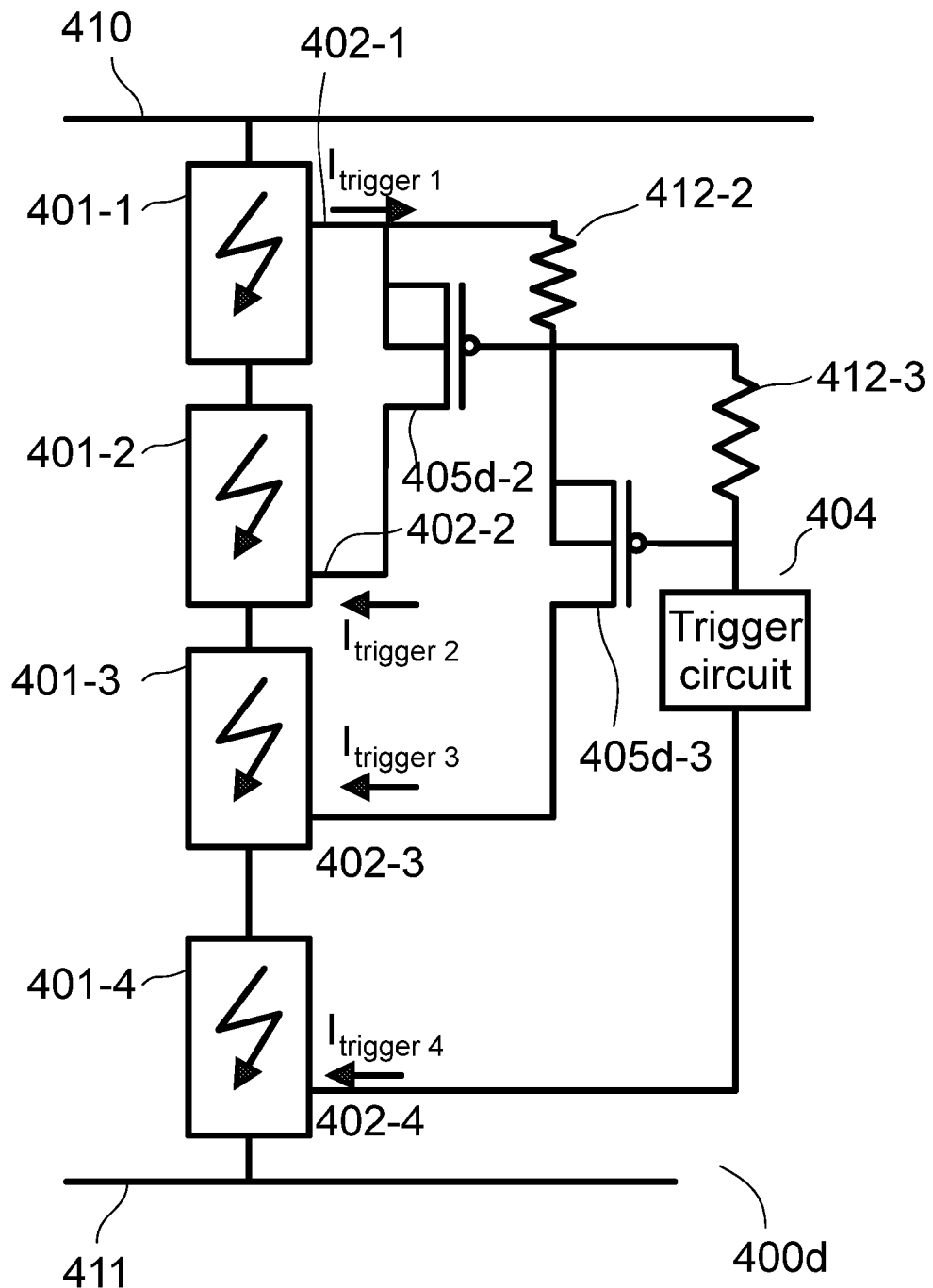
FIG. 4D is a schematic diagram depicting an eighth example embodiment of an ESD protection device including four ESD clamps.

FIGS. 4C and 4D are schematic diagrams depicting more example embodiments of an ESD protection device 400c and 400d including four ESD clamps 401-1, 401-2, 401-3, and 401-4. FIGS. 4C and 4D are similar to FIG. 1D. In FIG. 4C, PMOS 405c-2 and PMOS 405c-3 may replace PMOS 105d from FIG. 1D. In FIG. 4D, PMOS 405d-2 and PMOS 405d-3 may replace PMOS 105d from FIG. 1D.

The example embodiment of the ESD protection device 400c in FIG. 4C is similar to the example embodiment 400a depicted in FIG. 4A, wherein PMOSs 405c-2 and 405c-3 and an additional resistor 412 replace PNPs 405a-2 and 405a-3 from FIG. 4A. The gates of PMOSs 405c-2 and 405c-3 may share the same node and the sources of PMOSs 405c-2 and 405c-3 may also share the same node. In other embodiments, PMOS 405c-2 and PMOS 205c-3 may be merged into a single merged device such that they use the same gate and source but the merged device includes two separate drains. Note that a resistor may similarly be coupled between the emitters and bases of PNPs 405a-2 and 405a-3 in FIG. 4A. Resistor 412 may provide a current path for the trigger current flowing through trigger circuit 404, $I_{trigger4}$, from node 410 and as such may provide a bias voltage to the gates of PMOSs 405c-2 and 405c-3. The bias voltage may turn on PMOSs 405c-2 and 405c-3. Turning on PMOSs 405c-2 and 405c-3 may cause currents $I_{trigger2}$ and $I_{trigger3}$ to flow into trigger taps 402-2 and 402-3, respectively, and may draw current $I_{trigger1}$ from trigger tap 402-1. The trigger current $I_{trigger4}$ from trigger circuit 404, current $I_{trigger3}$, current $I_{trigger2}$, and current $I_{trigger1}$ may trigger ESD clamps 401-4, 401-3, 401-2, and 401-1 to enter a conductive state and shunt ESD current from node 410 to node 411.

The example embodiment of the ESD protection device 400d in FIG. 4D is similar to the example embodiment 400b depicted in FIG. 4B, wherein PMOSs 405d-2 and 405d-3 and additional resistors 412-2 and 412-3 replace NPNs 405b-2 and 405b-3 from FIG. 4B. Resistor 412-2 may be coupled between the source and gate of PMOS 405d-2 and resistor 412-3 may be coupled between the source and gate of PMOS 405d-3. The gate of PMOS 405d-2 may be coupled to the source of PMOS 405d-3 and the gate of PMOS 405d-3 may be coupled to the anode of trigger circuit 404. Note that a resistor may similarly be coupled between the emitter and base of PNP 405b-2 and a resistor may be coupled between the emitter and base of PNP 405b-3 in FIG. 4B. Resistors 412-2 and 412-3 may provide a current path for the trigger current flowing through trigger circuit 404, $I_{trigger4}$, from node 410 and as such may each provide respective bias voltages to the gates of PMOSs 405d-2 and 405d-3. The bias voltages may turn on PMOSs 405d-2 and 405d-3. Turning on PMOSs 405d-2 and 405d-3 may cause currents $I_{trigger2}$ and $I_{trigger3}$ to flow into trigger taps 402-2 and 402-3, respectively. PMOS 405d-2 may draw current $I_{trigger1}$ from trigger tap 402-1. The trigger current $I_{trigger4}$ from trigger circuit 404, current $I_{trigger3}$, current $I_{trigger2}$, and current $I_{trigger1}$ may trigger ESD clamps 401-4, 401-3, 401-2, and 401-1 to enter a conductive state and shunt ESD current from node 410 to node 411.

As described above, FIGS. 1C and 1D are schematic diagrams depicting example embodiments of the ESD protection devices 100c and 100d including a stack of three ESD clamps. As further described above, FIGS. 4A-4D are schematic diagrams depicting example embodiments of the ESD protection devices 200a-200d including a stack of four ESD clamps. Although these example embodiments are depicted and described with stacks of three or four ESD clamps, the teachings disclosed herein may extend to embodiments wherein the stacks may include any number of ESD clamps three or greater. Like FIGS. 3A-3D, FIGS. 5A-5D are schematic diagrams depicting example embodiments of ESD protection devices showing how additional ESD clamps and corresponding transistors may be added. Although FIGS. 5A-5D depict a single additional ESD clamp 501-i and a single additional transistor 505a-i-505d-i, any additional number of ESD clamps and corresponding transistors may be added. Thus, with reference to FIGS. 5A-5D, i=3, . . . , n−2, and n>=5. For example in FIG. 5A, for an example embodiment with a stack of n=7 ESD clamps, there may be three additional ESD clamps 501-i and three additional PNPs 505a-i, wherein i=3, 4, and 5.

Figure 5A:
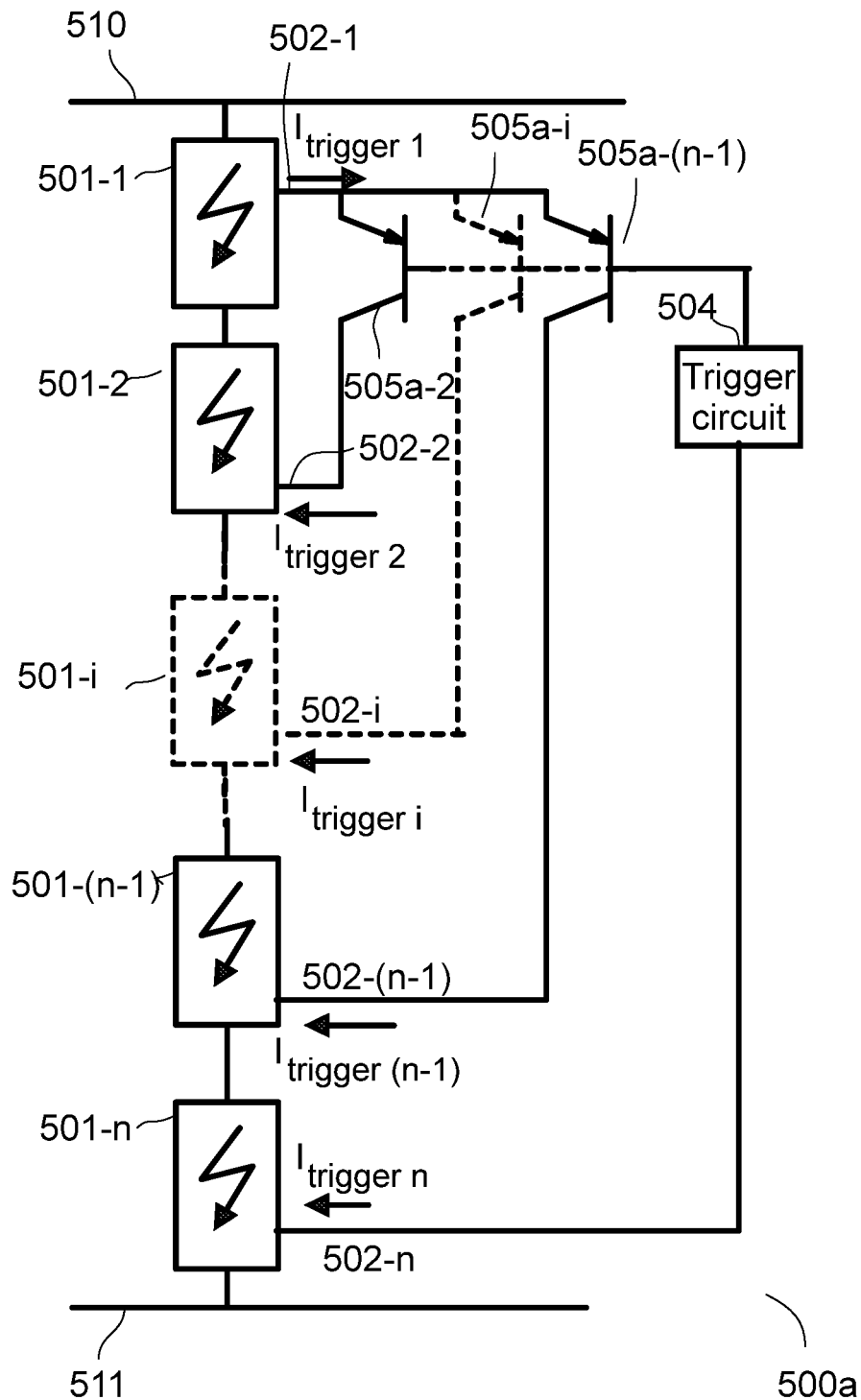
FIG. 5A is a schematic diagram depicting a fifth example embodiment of an ESD protection device including five or more ESD clamps.

FIG. 5A is a schematic diagram depicting an example embodiment of an ESD protection device 500a including any number of multiple additional ESD clamps 501-i and a corresponding number of PNPs 505a-i. The example embodiment 500a depicted in FIG. 5A is similar to the example embodiment 400a depicted in FIG. 4A, and one of ordinary skill in the art would recognize that similar principles as set forth above for FIG. 4A also apply to FIG. 5A. Although FIG. 5A depicts separate PNPs 505a-2-505a-(n−1), these PNPs may be merged into a single merged device such that they use the same base and emitter but the merged device includes separate collectors for providing trigger currents $I_{trigger\ 2}$-$I_{trigger\ n-1}$.

Figure 5B:
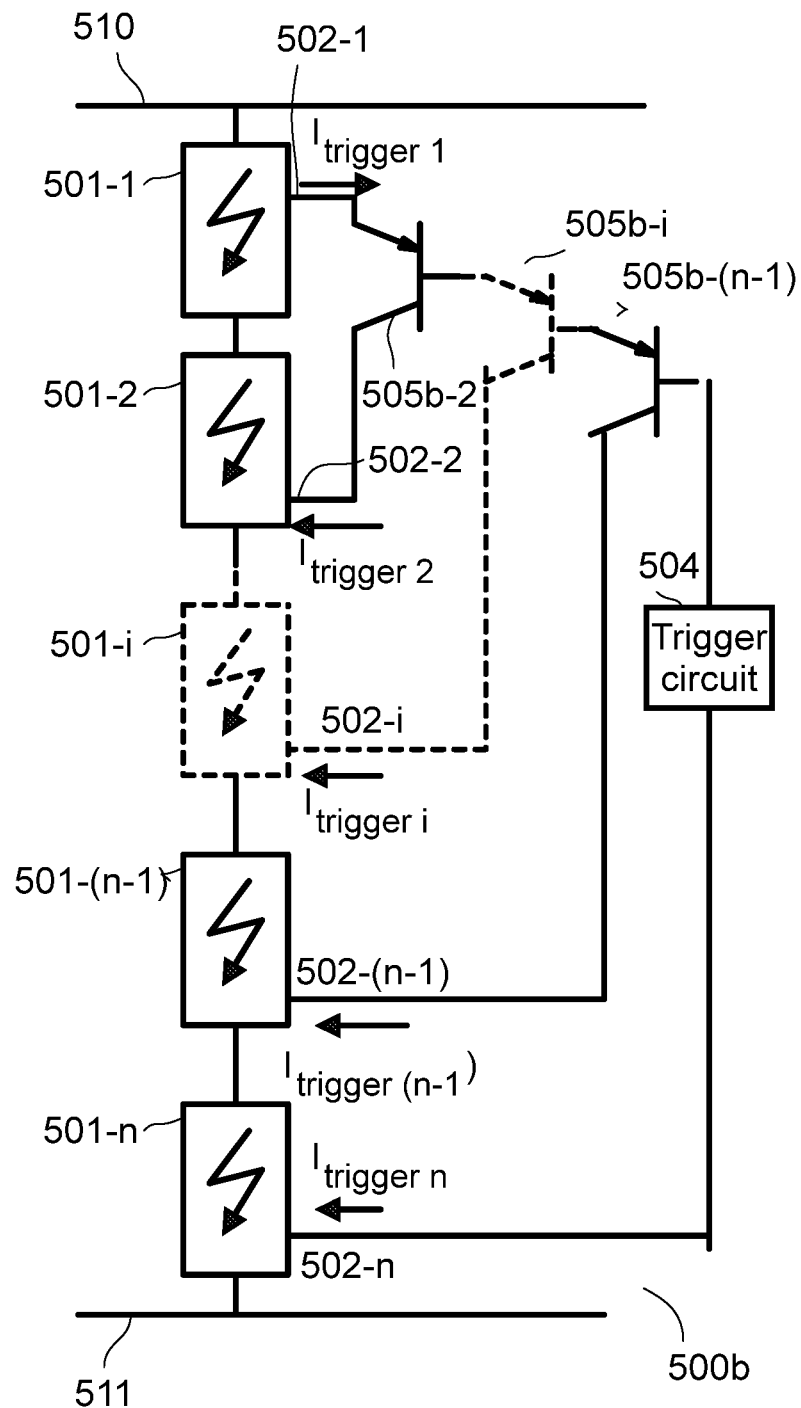
FIG. 5B is a schematic diagram depicting a sixth example embodiment of an ESD protection device including five or more ESD clamps.

FIG. 5B is a schematic diagram depicting an example embodiment of an ESD protection device 500b including any number of multiple additional ESD clamps 501-i and a corresponding number of PNPs 505b-i. The example embodiment 500b depicted in FIG. 5B is similar to the example embodiment 400b depicted in FIG. 4B, and one of ordinary skill in the art would recognize that similar principles as set forth above for FIG. 4B also apply to FIG. 5B.

Figure 5C:
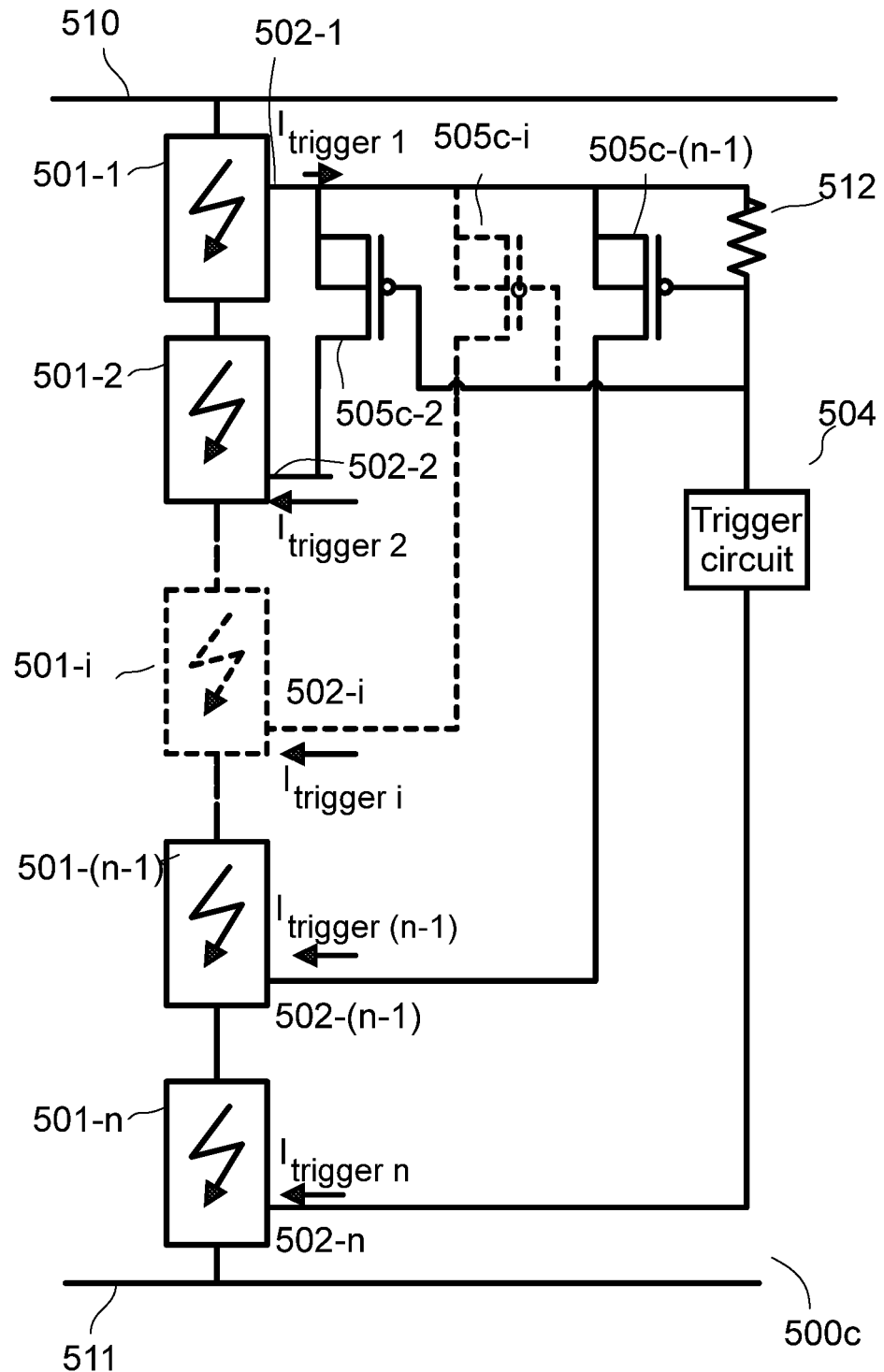
FIG. 5C is a schematic diagram depicting a seventh example embodiment of an ESD protection device including five or more ESD clamps.

FIG. 5C is a schematic diagram depicting an example embodiment of an ESD protection device 500c including any number of multiple additional ESD clamps 501-i and a corresponding number of PMOSs 505c-i. The example embodiment 500c depicted in FIG. 5C is similar to the example embodiment 400c depicted in FIG. 4C, and one of ordinary skill in the art would recognize that similar principles as set forth above for FIG. 4C also apply to FIG. 5C. Although FIG. 5C depicts separate PMOSs 505c-2-505c-(n−1), these PMOSs may be merged into a single merged device such that they use the same gate and source but the merged device includes separate drains for providing trigger currents $I_{trigger\ 2}$-$I_{trigger\ n-1}$.

Figure 5D:
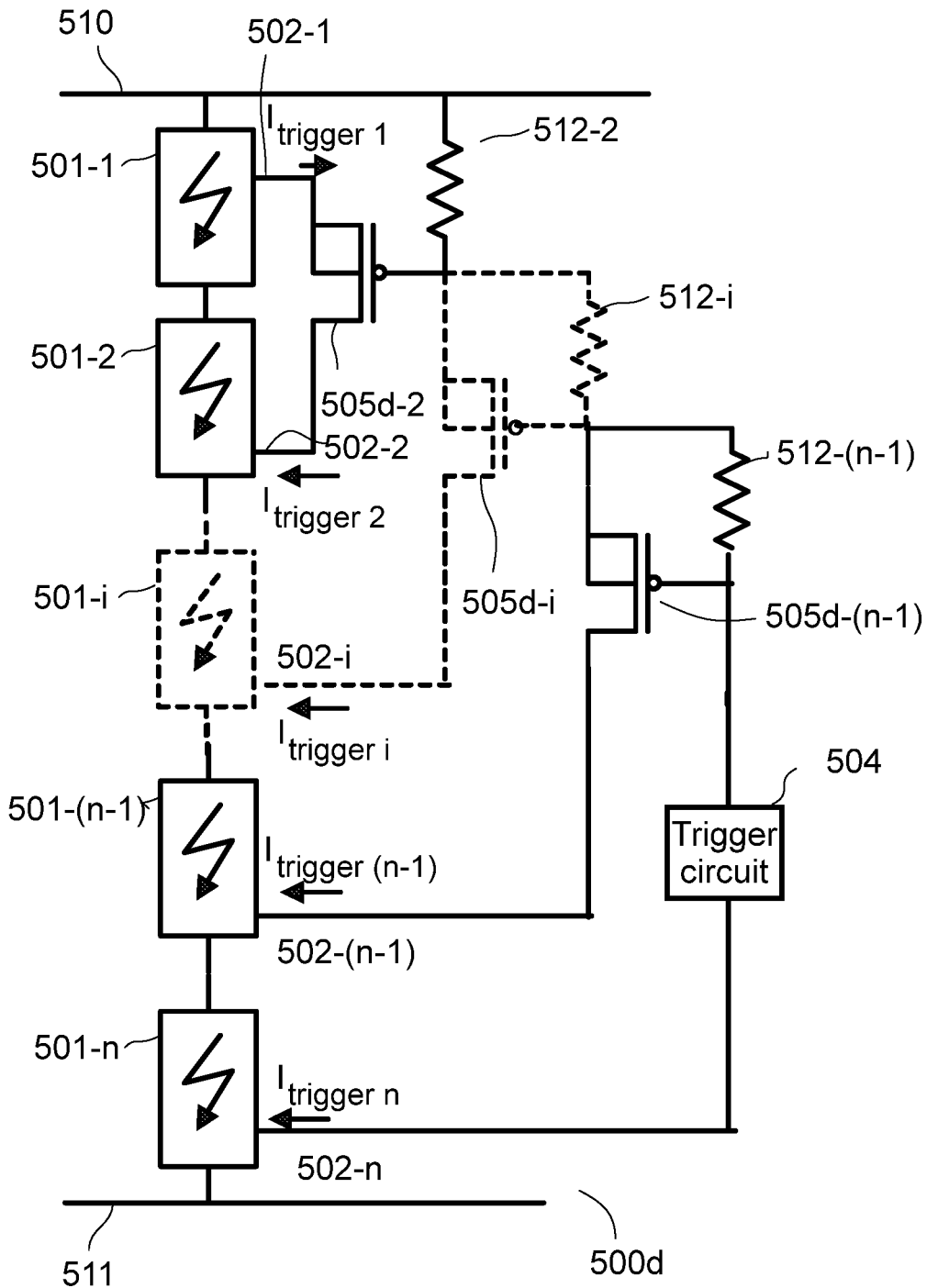
FIG. 5D is a schematic diagram depicting an eighth example embodiment of an ESD protection device including five or more ESD clamps.

FIG. 5D is a schematic diagram depicting an example embodiment of an ESD protection device 500d including any number of multiple additional ESD clamps 501-i and a corresponding number of PMOSs 505d-i and additional resistors 512-i. The example embodiment 500d depicted in FIG. 5D is similar to the example embodiment 400d depicted in FIG. 4D, and one of ordinary skill in the art would recognize that similar principles as set forth above for FIG. 4D also apply to FIG. 5D.

Figure 6A:
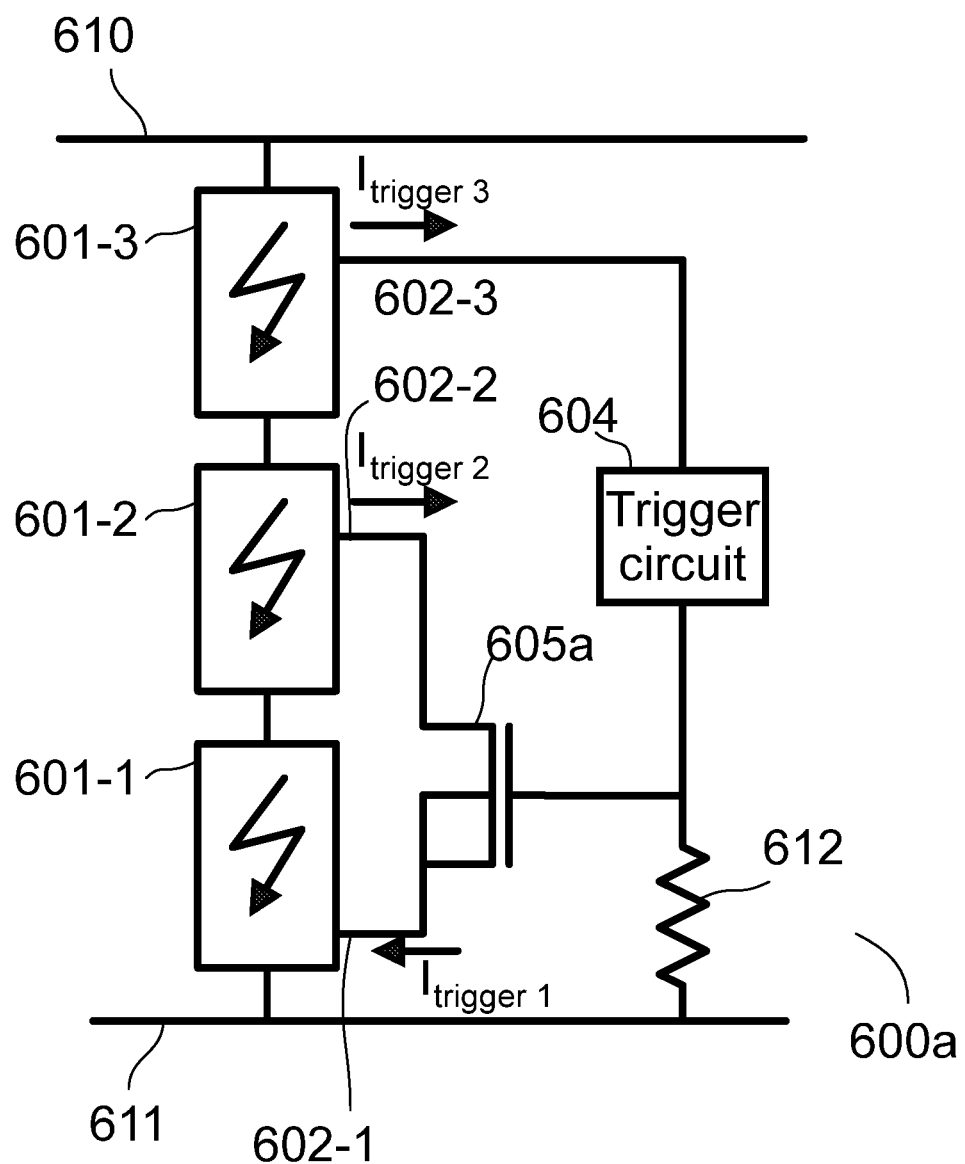
FIG. 6A is a schematic diagram depicting a first example embodiment of an ESD protection device including an alternative arrangement of a resistor.

FIG. 6A is a schematic diagram depicting an example embodiment of an ESD protection device 600a. The example embodiment 600a depicted in FIG. 6A is similar to the example embodiment 100b depicted in FIG. 1B except that resistor 612 in FIG. 6A may be coupled between the gate of NMOS 605A and node 611, rather than between the gate and source such as depicted in FIG. 1B.

Figure 6B:
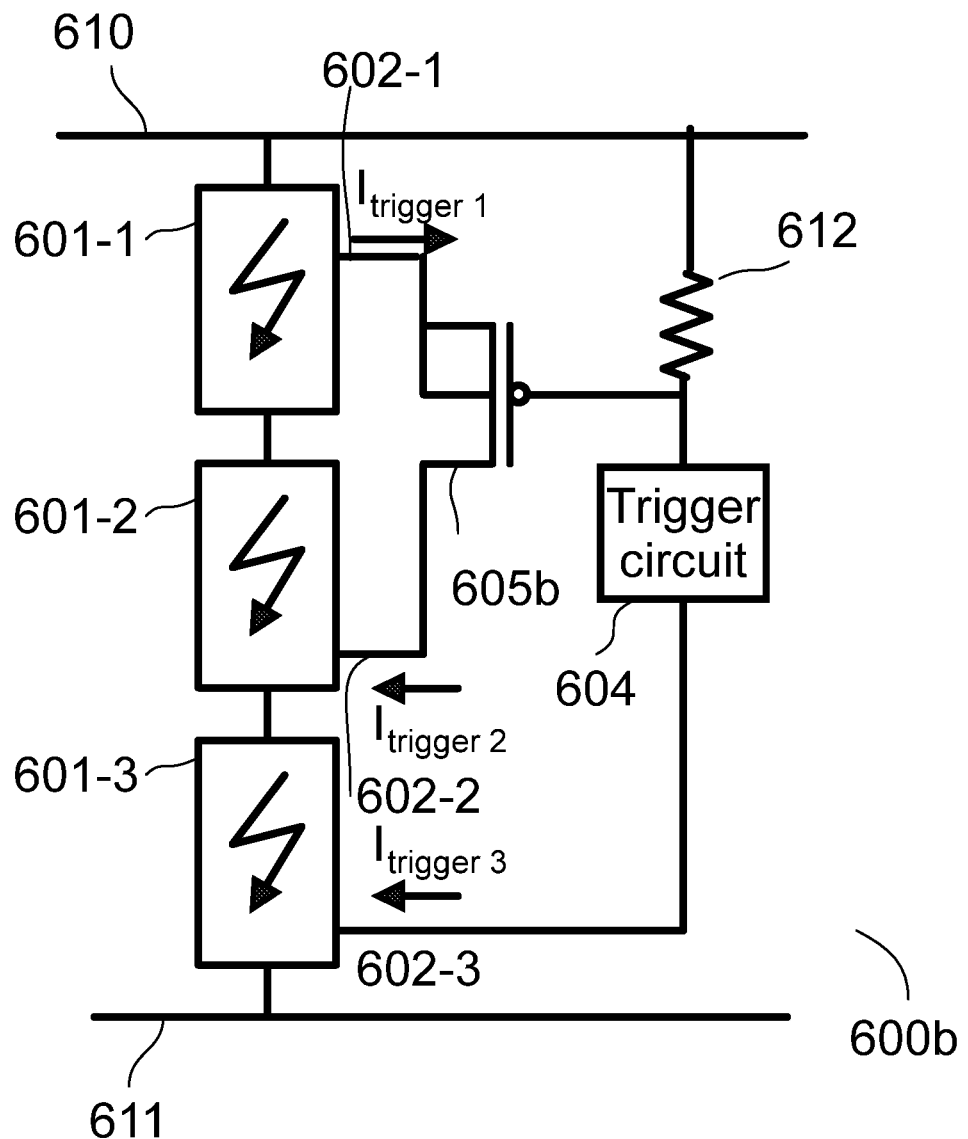
FIG. 6B is a schematic diagram depicting a second example embodiment of an ESD protection device including an alternative arrangement of a resistor.

FIG. 6B is a schematic diagram depicting another example embodiment of an ESD protection device 600b. The example embodiment 600b depicted in FIG. 6B is similar to the example embodiment 100d depicted in FIG. 1D except that resistor 612 in FIG. 6B may be coupled between node 610 and the gate of PMOS 605B, rather than between the source and gate such as depicted in FIG. 1D.

Although additional figures are not explicitly provided herein, one of ordinary skill in the art should recognize that the adjustments to the resistor coupling 112 in FIGS. 1B and 1D as reflected in FIGS. 6A and 6B may be equally applicable to any of the other embodiments provided herein. Likewise, it should be noted that for the embodiments depicted and described herein that include bipolar transistors, resistors may similarly be coupled between a base of the bipolar and either the first node or the second node appropriately.

Figure 7A:
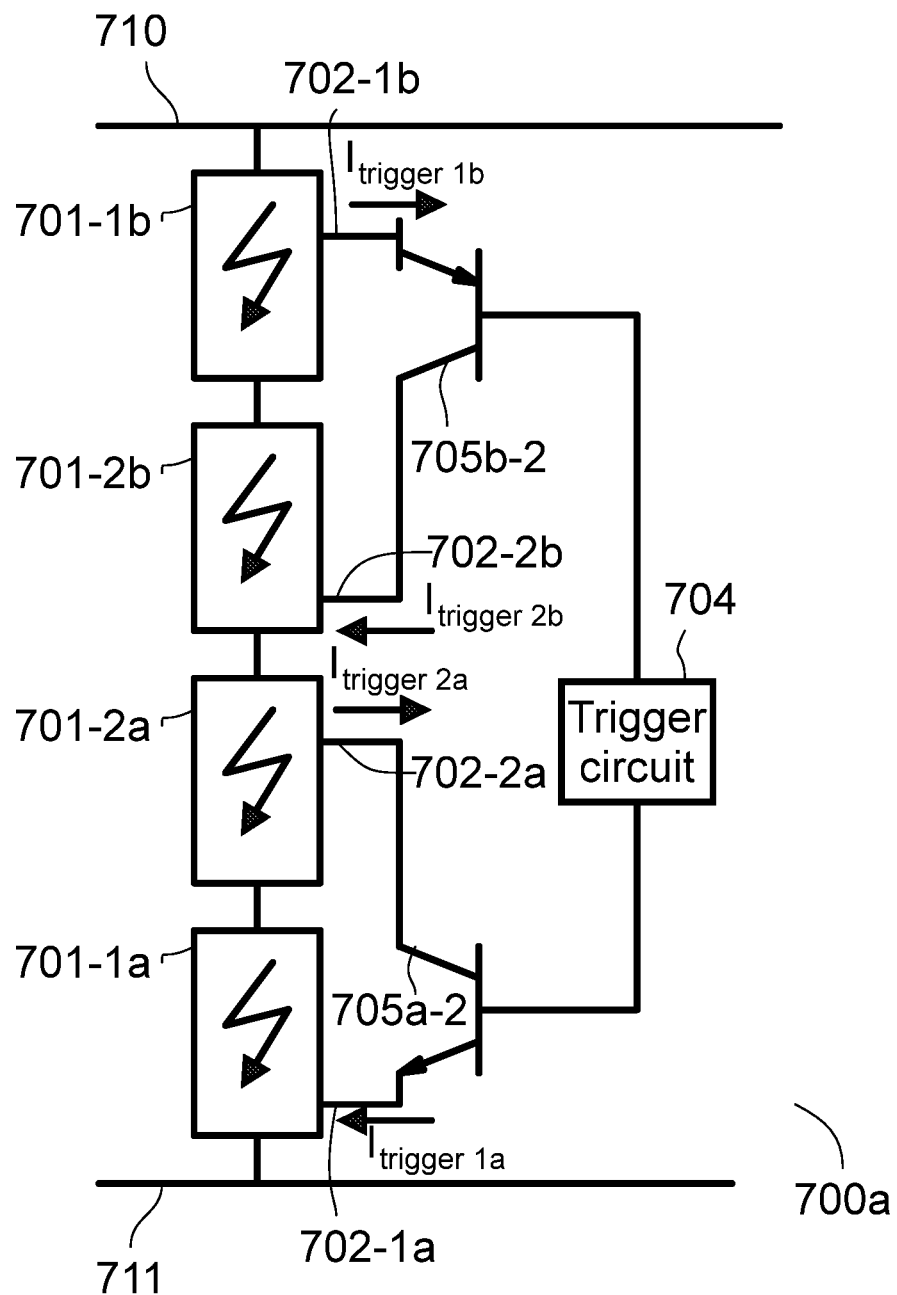
FIG. 7A is a schematic diagram depicting an example embodiment of an ESD protection device including a PNP transistor and an NPN transistor.

FIG. 7A is a schematic diagram depicting an example embodiment of an ESD protection device 700a including four ESD clamps 701-1a, 701-2a, 701-2b, and 701-2a. The example embodiment 700a depicted in FIG. 7A combines teachings, for example, from example embodiment 100a in FIG. 1A and example embodiment 100c in FIG. 1C. As such, the description and teachings above with respect to FIGS. 1A and 1C are similarly applicable to the example embodiment 700a depicted in FIG. 7A. Note that the example embodiment 700a may be implemented with a single trigger circuit 704, wherein a trigger current flowing through trigger circuit 704 that may result from an ESD event may turn on PNP 705b-2 and NPN 705a-2, which may then trigger ESD clamps 701-1a, 701-2a, 701-1b, and 701-2b to enter into a conductive state and shunt ESD current from node 710 to node 711. Use of multiple trigger circuits is also possible without departing from the spirit of the teachings herein. For example, with respect to FIG. 7A, a first trigger circuit with its cathode coupled to the base of NPN 705a-2 may have the anode of first trigger circuit directly or indirectly coupled to node 710, and a second trigger circuit with its anode coupled to the base of PNP 705b-2 may have the cathode of the second trigger circuit directly or indirectly coupled to node 711.

Figure 7B:
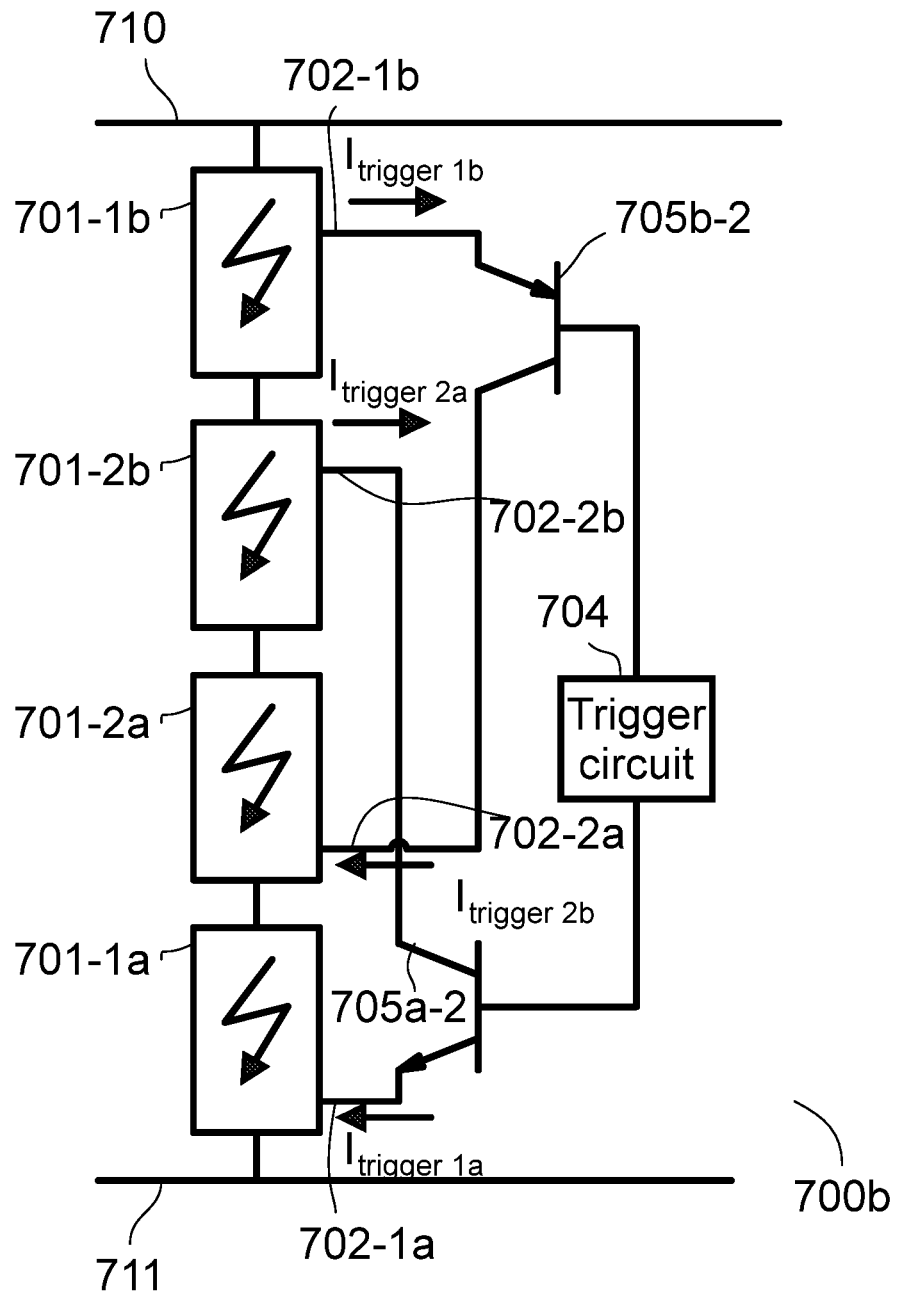
FIG. 7B is a schematic diagram depicting another example embodiment of an ESD protection device including a PNP transistor and an NPN transistor with alternative couplings to the ESD clamps.
Figure 7C:
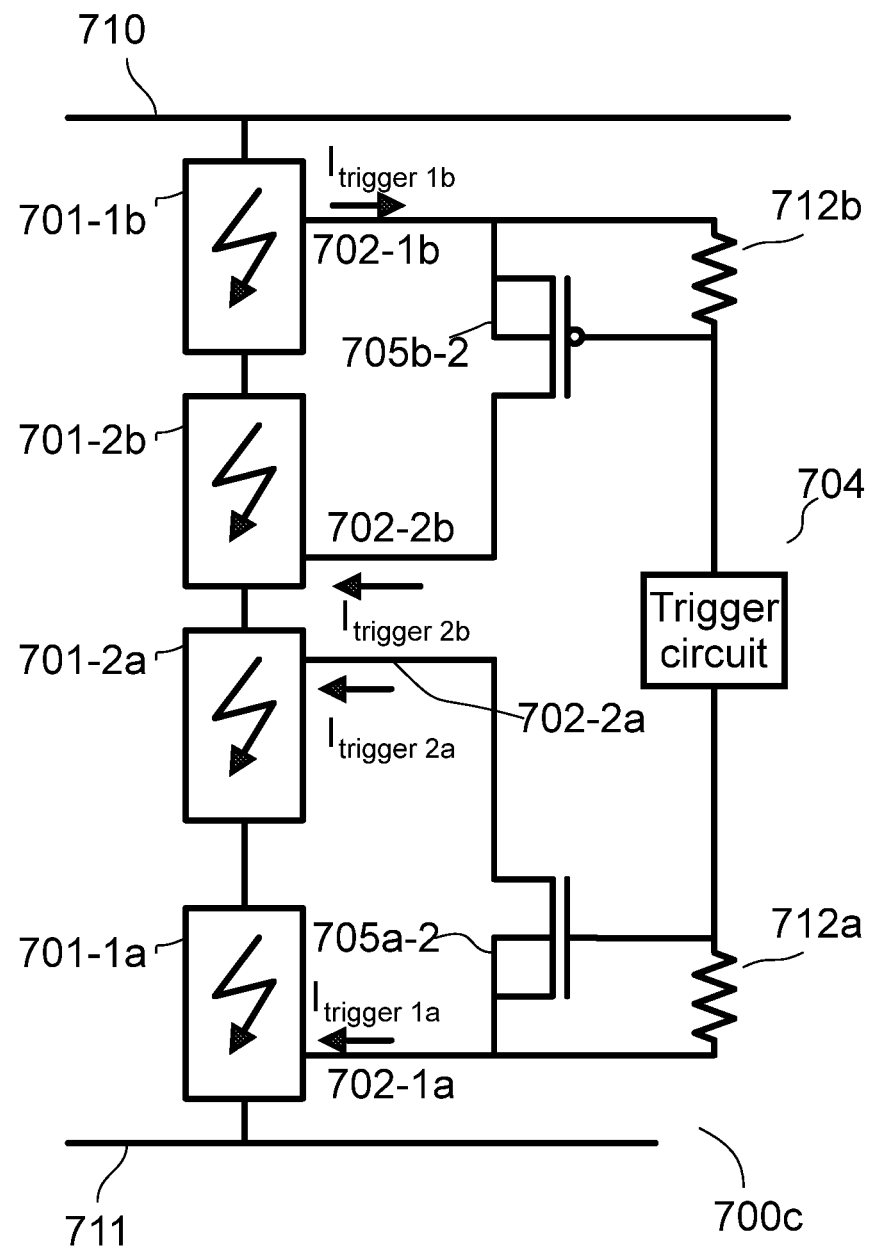
FIG. 7C is a schematic diagram depicting an example embodiment of an ESD protection device including a PMOS transistor and an NMOS transistor.
Figure 7D:
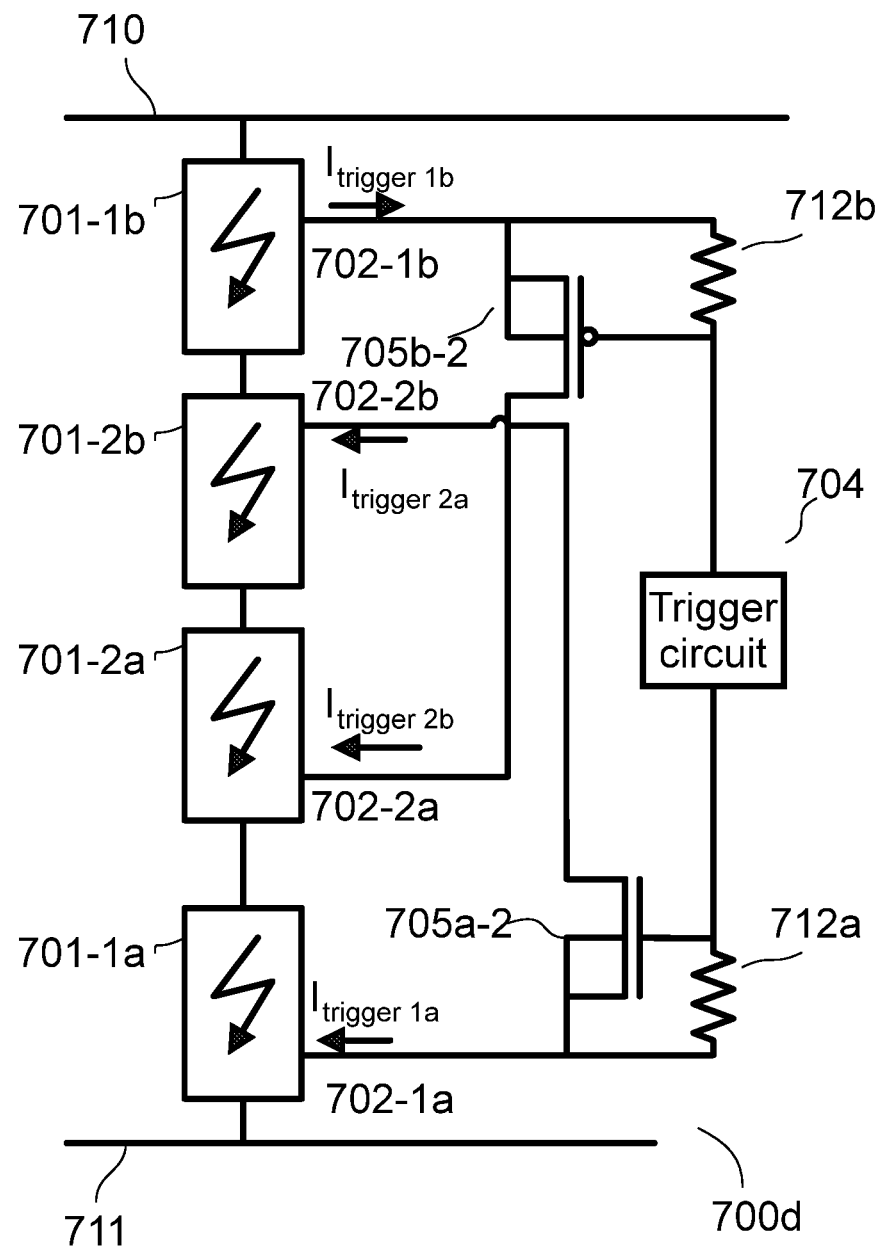
FIG. 7D is a schematic diagram depicting another example embodiment of an ESD protection device including a PMOS transistor and an NMOS transistor with alternative couplings to the ESD clamps.
Figure 8A:
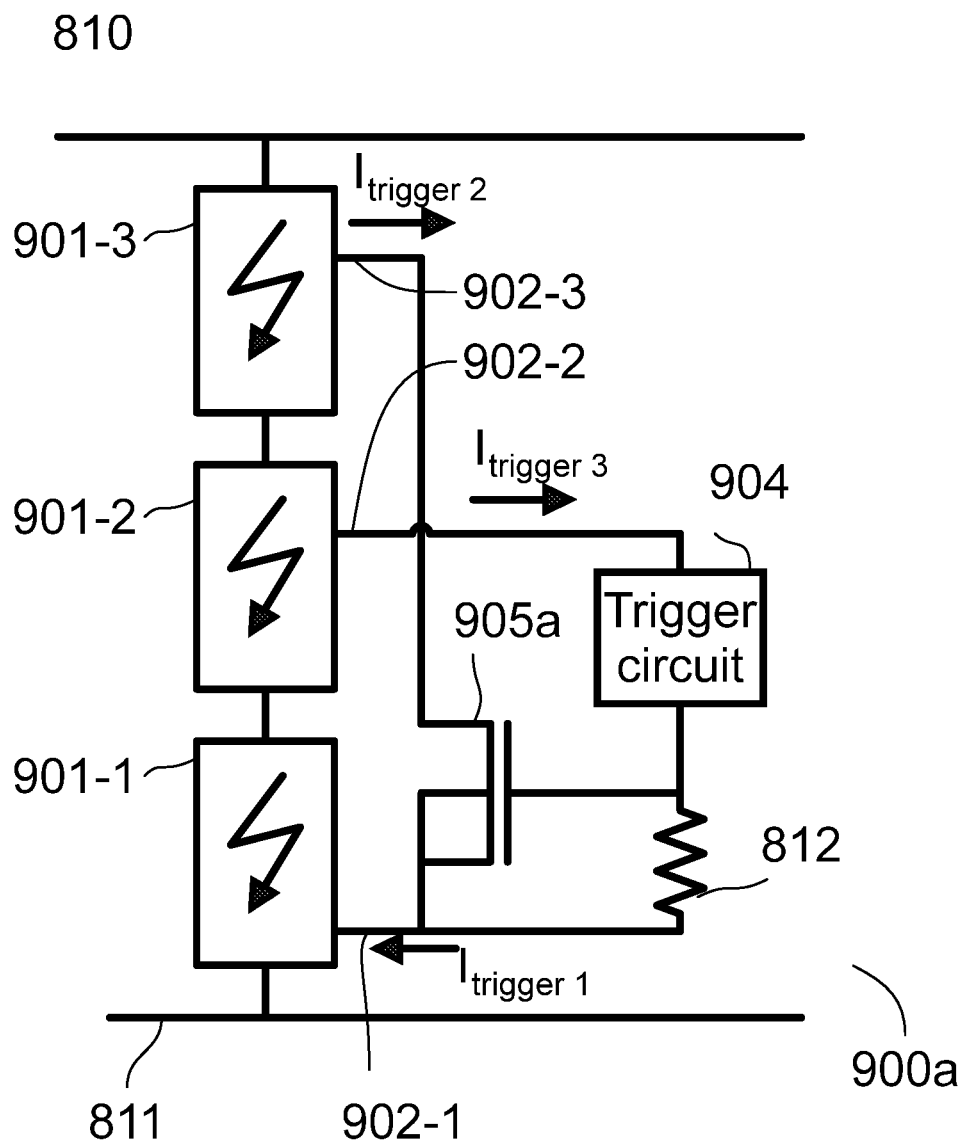
FIG. 8A is a schematic diagram depicting an example embodiment of an ESD protection device including an NMOS transistor and trigger circuit with alternative couplings to the ESD clamps.
Figure 8B:
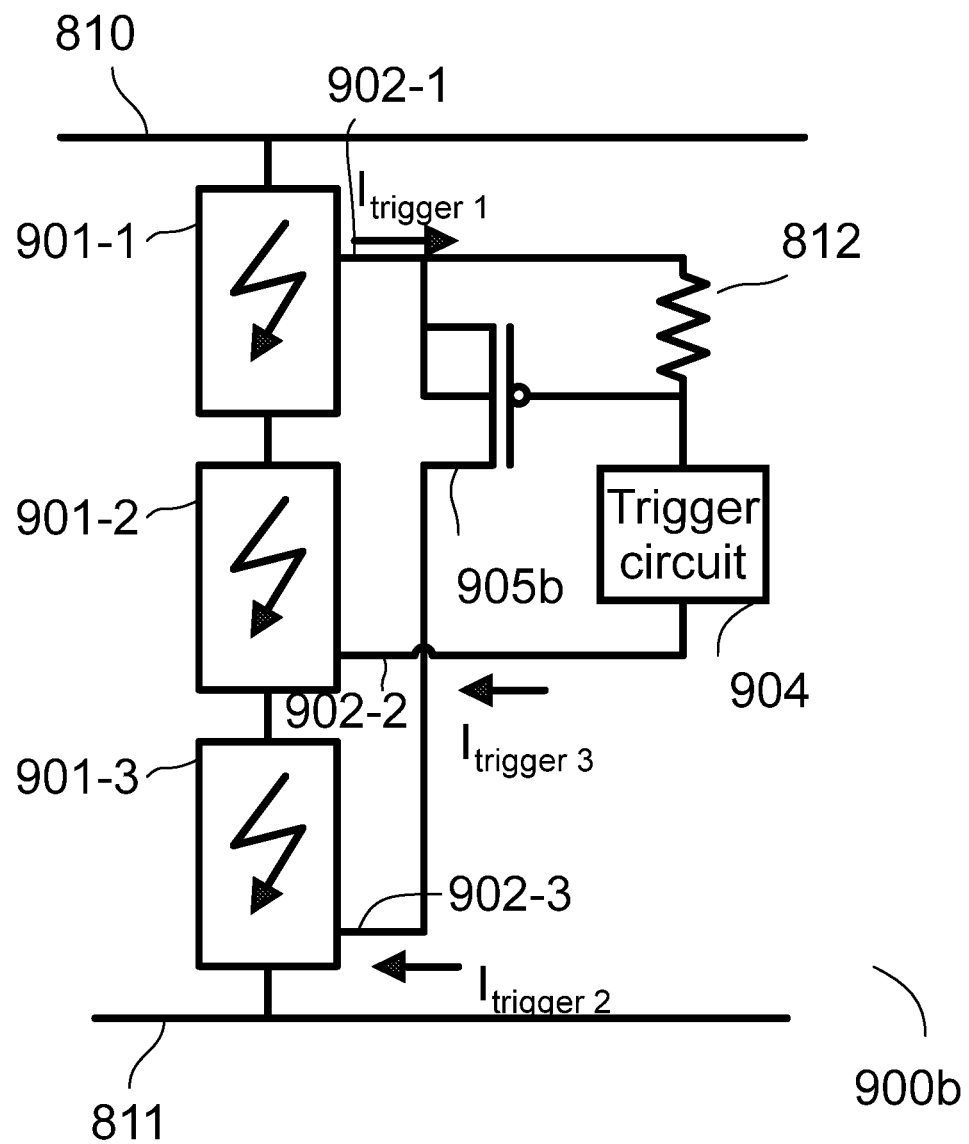
FIG. 8B is a schematic diagram depicting an example embodiment of an ESD protection device including a PMOS transistor and trigger circuit with alternative couplings to the ESD clamps.

FIG. 7C is a schematic diagram depicting another example embodiment of an ESD protection device 700c including four ESD clamps 701-1a, 701-2a, 701-2b, and 701-2a. The example embodiment 700c depicted in FIG. 7C is similar to the example embodiment 700a in FIG. 7A and combines teachings, for example, from example embodiment 100b from FIG. 1B and example embodiment 100d from FIG. 1D. As such, the description and teachings above with respect to FIGS. 1B and 1D are similarly applicable to the example embodiment 700c depicted in FIG. 7C.

Figure 9A:
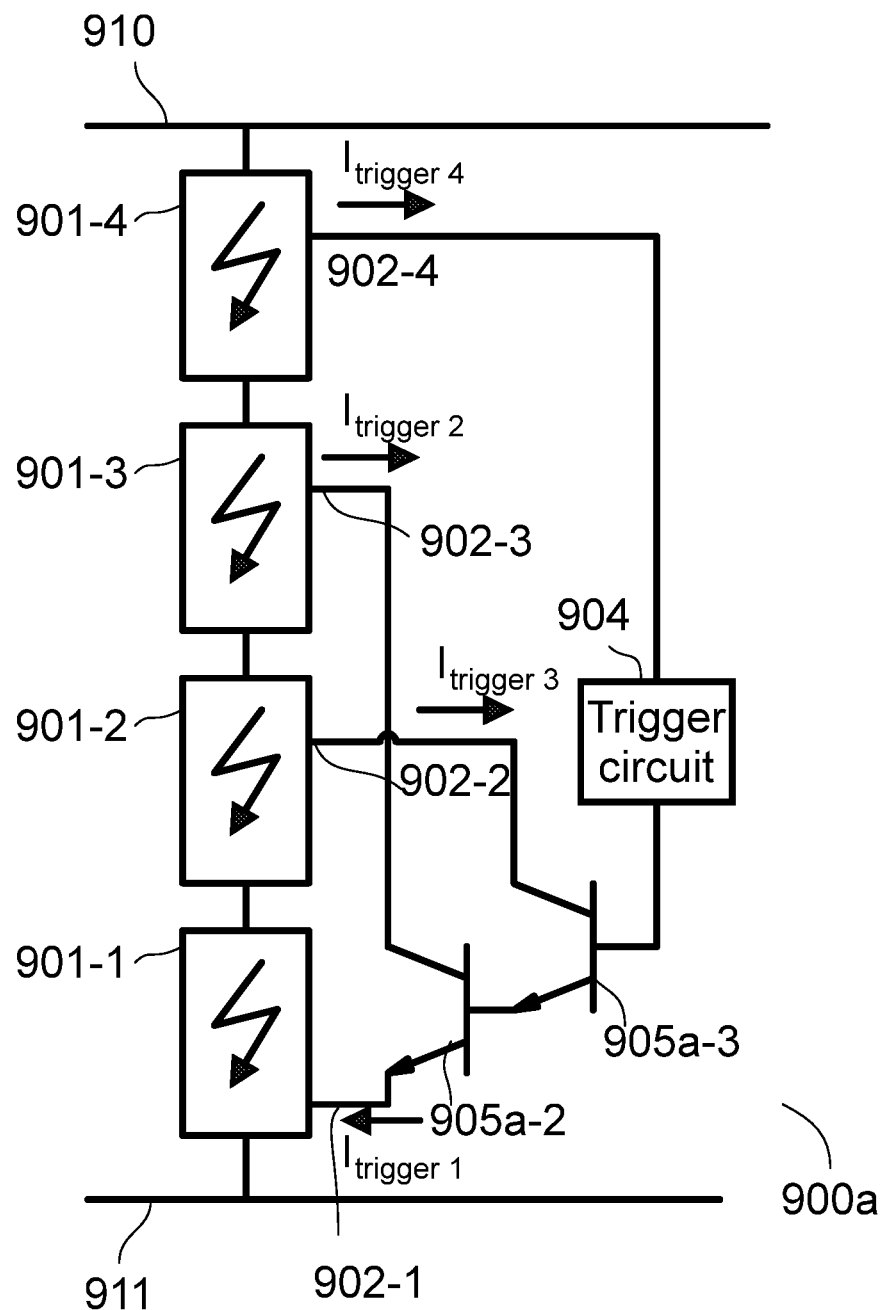
FIG. 9A is a schematic diagram depicting an example embodiment of an ESD protection device including four ESD clamps and two NPN transistors with alternative couplings to the ESD clamps.
Figure 9B:
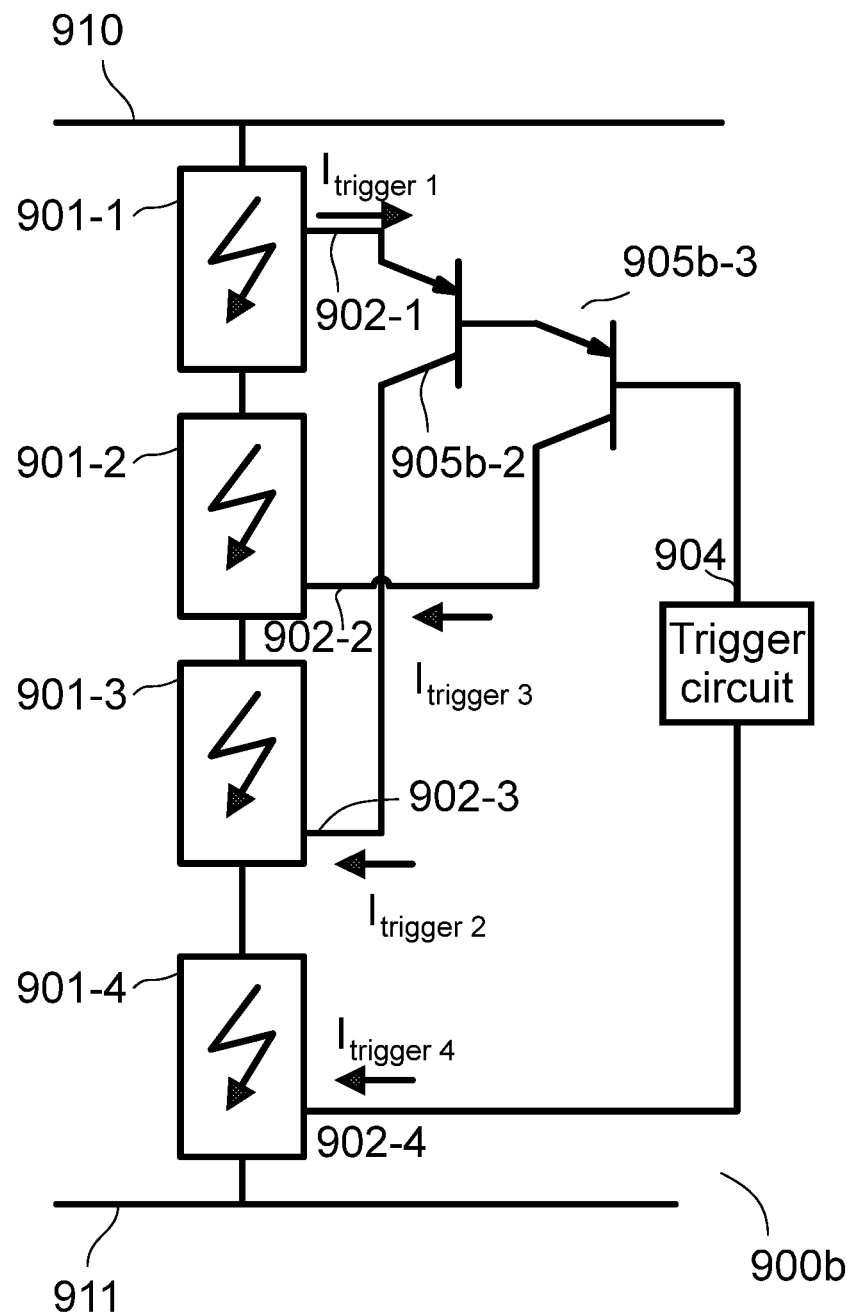
FIG. 9B is a schematic diagram depicting an example embodiment of an ESD protection device including four ESD clamps and two PNP transistors with alternative couplings to the ESD clamps.

One should recognize that the couplings of the transistors and the trigger circuit to the ESD clamps depicted and described herein may be interchanged. Examples of interchanged couplings are shown by way of example in FIGS. 7B, 7D, 8A, 8B, 9A, and 9B. These examples do not represent an exhaustive demonstration of the possible ways to interchange the couplings of the transistors and trigger circuit to the ESD clamps, but rather demonstrate the principle that may be applied to any of the embodiments depicted and described herein. For example, FIG. 7B depicts PNP 705b-2 may be coupled to ESD clamps 701-1b and 701-2a and NPN 705a-2 may be coupled to ESD clamps 701-2b and 701-1a. Other possible couplings that one should readily recognize that fall within the teachings herein include, for example, PNP 705b-2 coupled to ESD clamps 701-2b and 701-2a and NPN 705a-2 coupled to ESD clamps 701-1b and 701-1a. As another example, although FIGS. 9A and 9B demonstrate example alternative couplings to those depicted in FIGS. 2B and 4B for a four ESD clamp embodiment, alternative couplings are also possible for the other four ESD clamp example embodiments provided herein. Thus, one should readily recognize that other alternative couplings are possible for all example embodiments of ESD protection devices including three ESD clamps, four ESD clamps, and larger numbers of ESD clamps that fall within the teachings provided herein. It is not practical to provide an exhaustive list of all possible permutations of couplings that fall within the teachings disclosed herein.

Figure 10A:
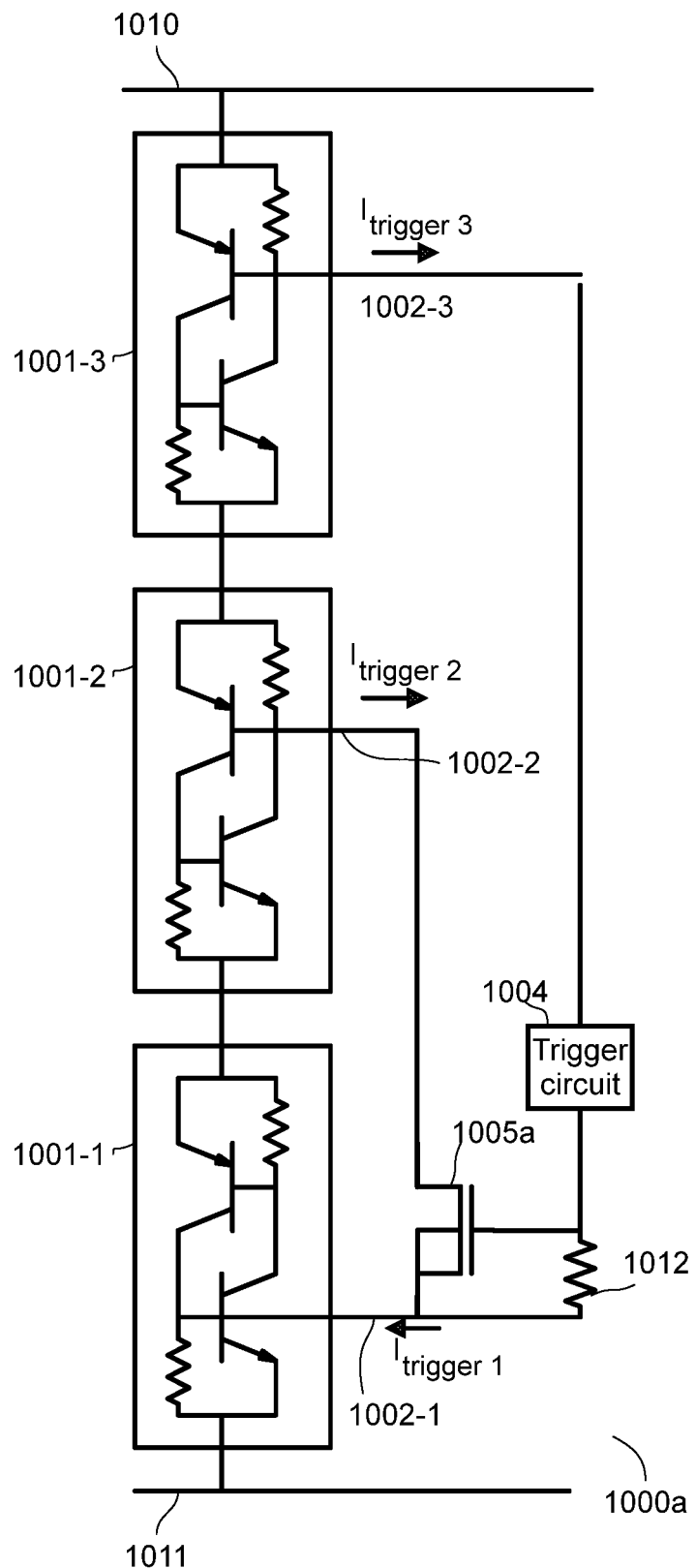
FIG. 10A is a schematic diagram depicting an example embodiment of an ESD protection device including an NMOS transistor, wherein the ESD clamps are implemented by a first version of a silicon controller rectifier (SCR).
Figure 10B:
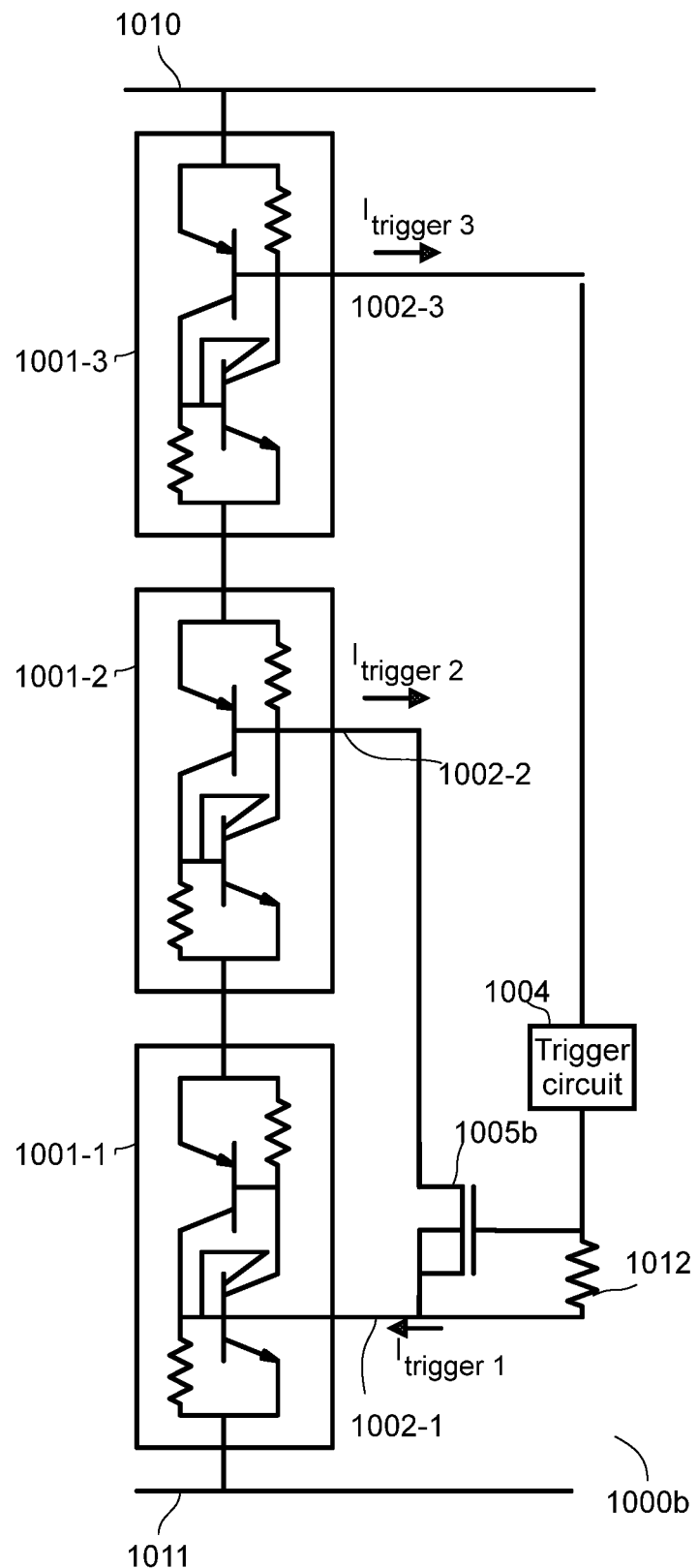
FIG. 10B is a schematic diagram depicting another example embodiment of an ESD protection device including an NMOS transistor, wherein the ESD clamps are implemented by a second version of an SCR.

FIGS. 10A and 10B are schematic diagrams depicting example embodiments of ESD protection devices similar to that depicted in FIG. 1B. In FIG. 10A, ESD clamps 1001-1, 1001-2, and 1001-3 are implemented by a first version of an SCR, and in FIG. 10B, ESD clamps 1001-1, 1001-2, and 1001-3 are implemented by a second version of an SCR, wherein the NPN transistor of the SCR includes an additional collector that may be coupled to the base of the NPN transistor. A modified version of the SCR may also be possible wherein in addition to or alternatively to the NPN transistor with the additional collector, the PNP transistor of the SCR may include an additional collector that may be coupled to the base of the PNP transistor. One should recognize that different combinations of the different implementations of the SCRs may also be included in a single embodiment of an ESD protection device.

Figure 10C:
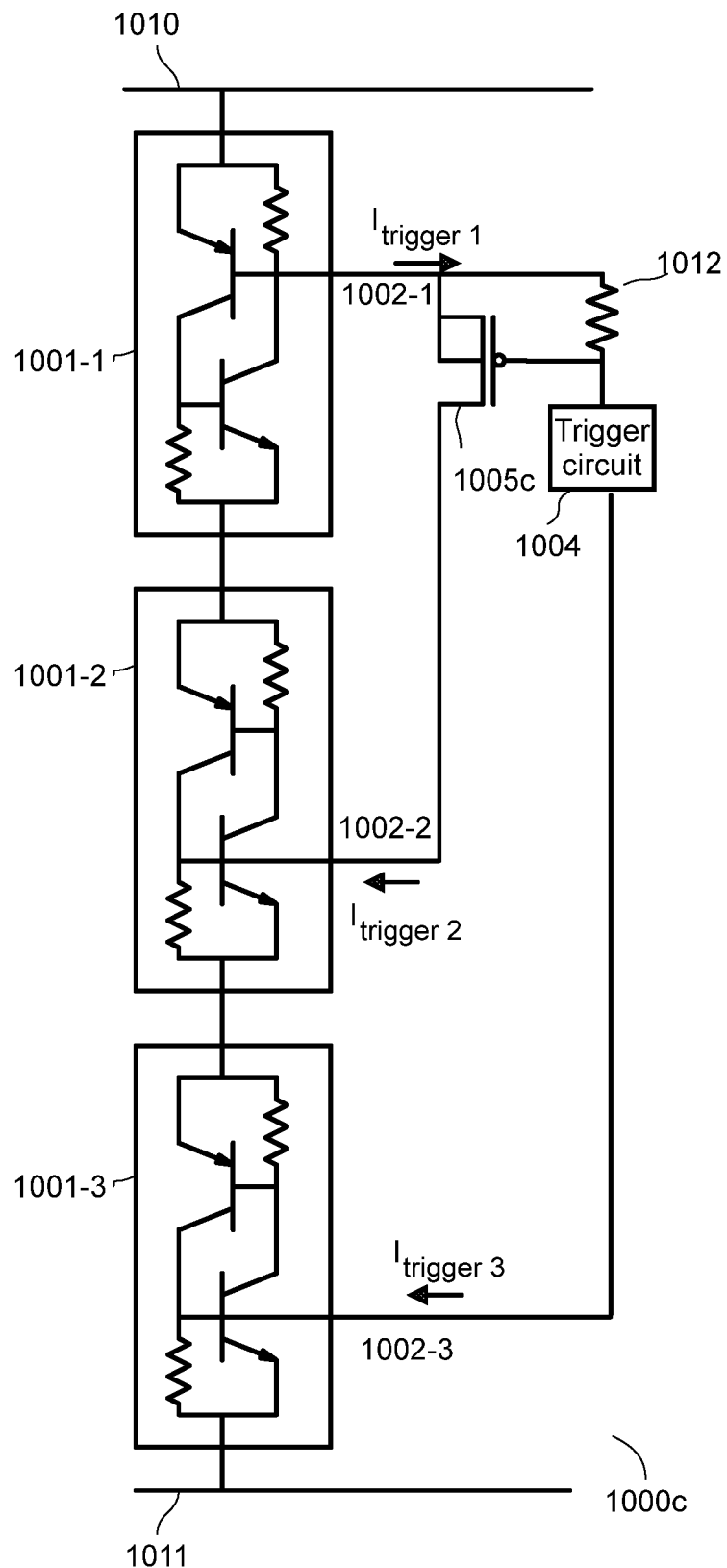
FIG. 10C is a schematic diagram depicting an example embodiment of an ESD protection device including a PMOS transistor, wherein the ESD clamps are implemented by a first version of an SCR
Figure 10D:
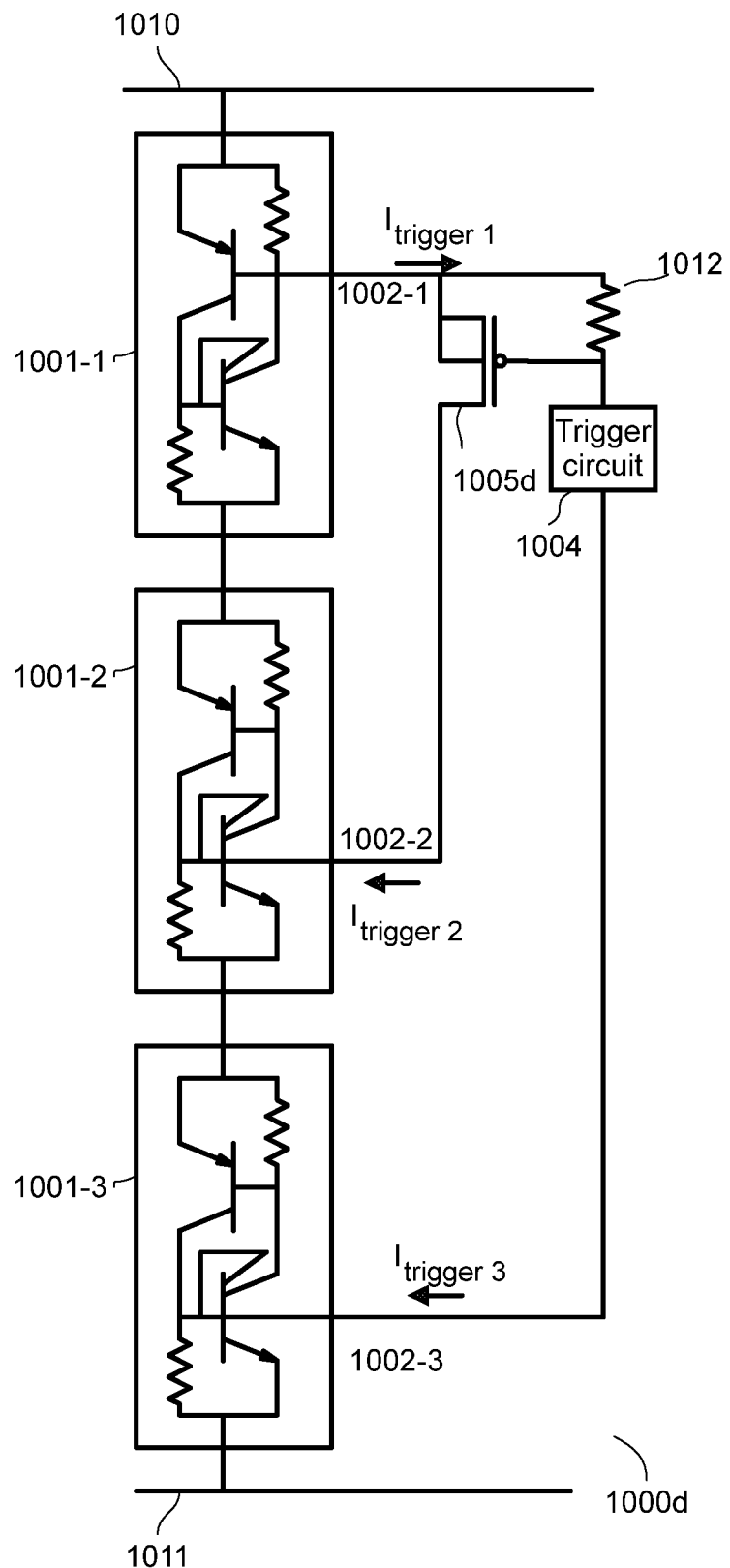
FIG. 10D is a schematic diagram depicting another example embodiment of an ESD protection device including a PMOS transistor, wherein the ESD clamps are implemented by a second version of an SCR.

FIGS. 10C and 10D are schematic diagrams depicting example embodiments of ESD protection devices similar to that depicted in FIG. 1D. Like in FIG. 10A, in FIG. 10C, ESD clamps 1001-1, 1001-2, and 1001-3 are implemented by a first version of an SCR. Like in FIG. 10B, in FIG. 10D, ESD clamps 1001-1, 1001-2, and 1001-3 are implemented by a second version of an SCR. Again, different versions of SCRs are possible and different combinations of the different versions of SCRS are also possible.

Although FIGS. 10A-10D depict implementations of the ESD clamps for topologies similar to FIGS. 1B and 1D, similar implementations including any combination of implementations of SCRs may be applied to any embodiment disclosed herein.

Figure 11A:
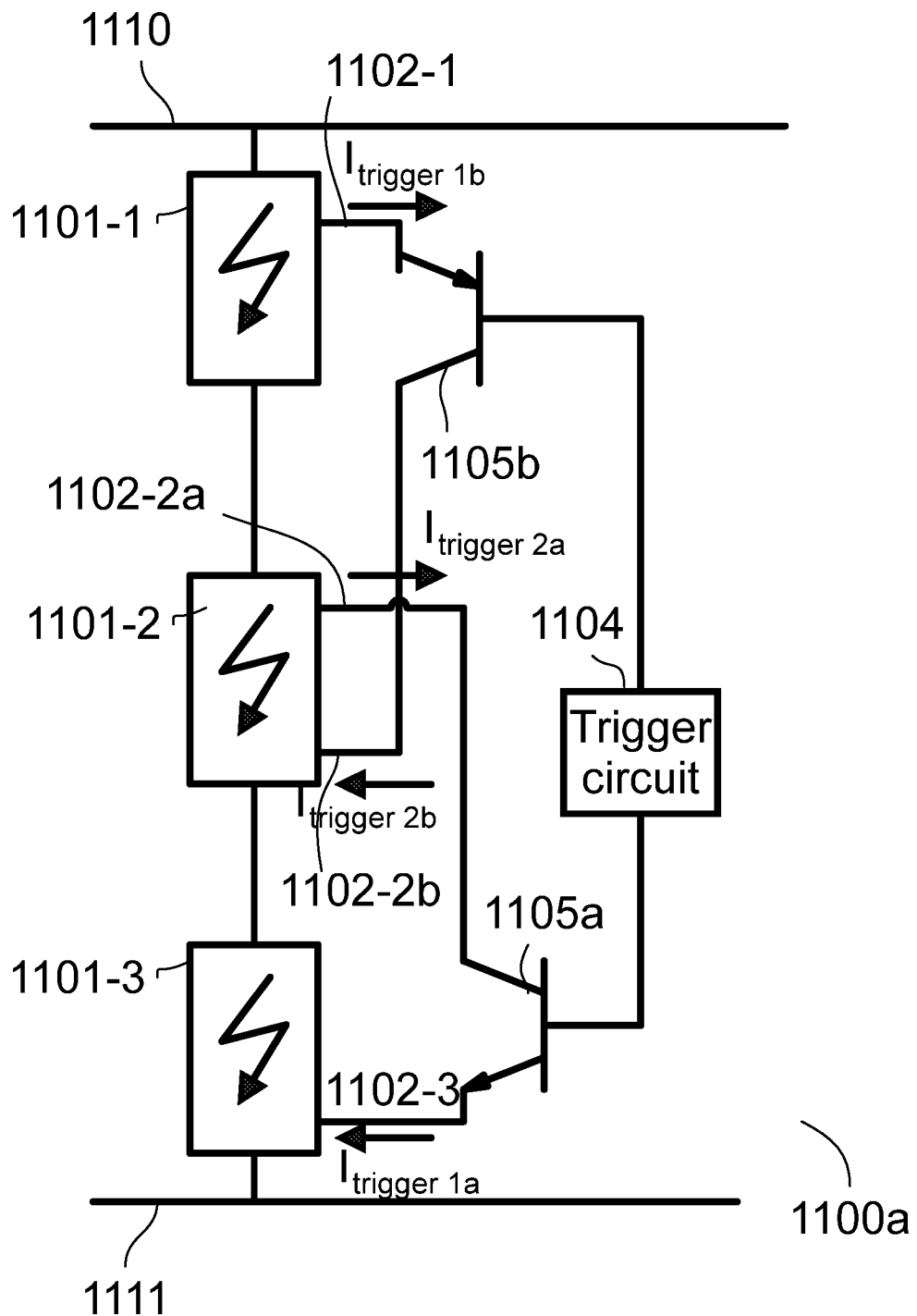
FIG. 11A is a schematic diagram depicting another example embodiment of an ESD protection device including an ESD clamp with multiple trigger taps.

FIG. 11A is a schematic diagram depicting another example embodiment of an ESD protection device 1100a including an ESD clamp 1101-2 with multiple trigger taps 1102-2a and 1102-2b. In accordance with the teachings provided above, trigger current $I_{trigger\ 2a}$ may be drawn from trigger tap 1102-2a to trigger ESD clamp 1101-2 to enter into a conductive state and further $I_{trigger\ 2b}$ may be provided to trigger tap 1102-2b to trigger ESD clamp 1101-2 to enter into a conductive state.

Figure 11B:
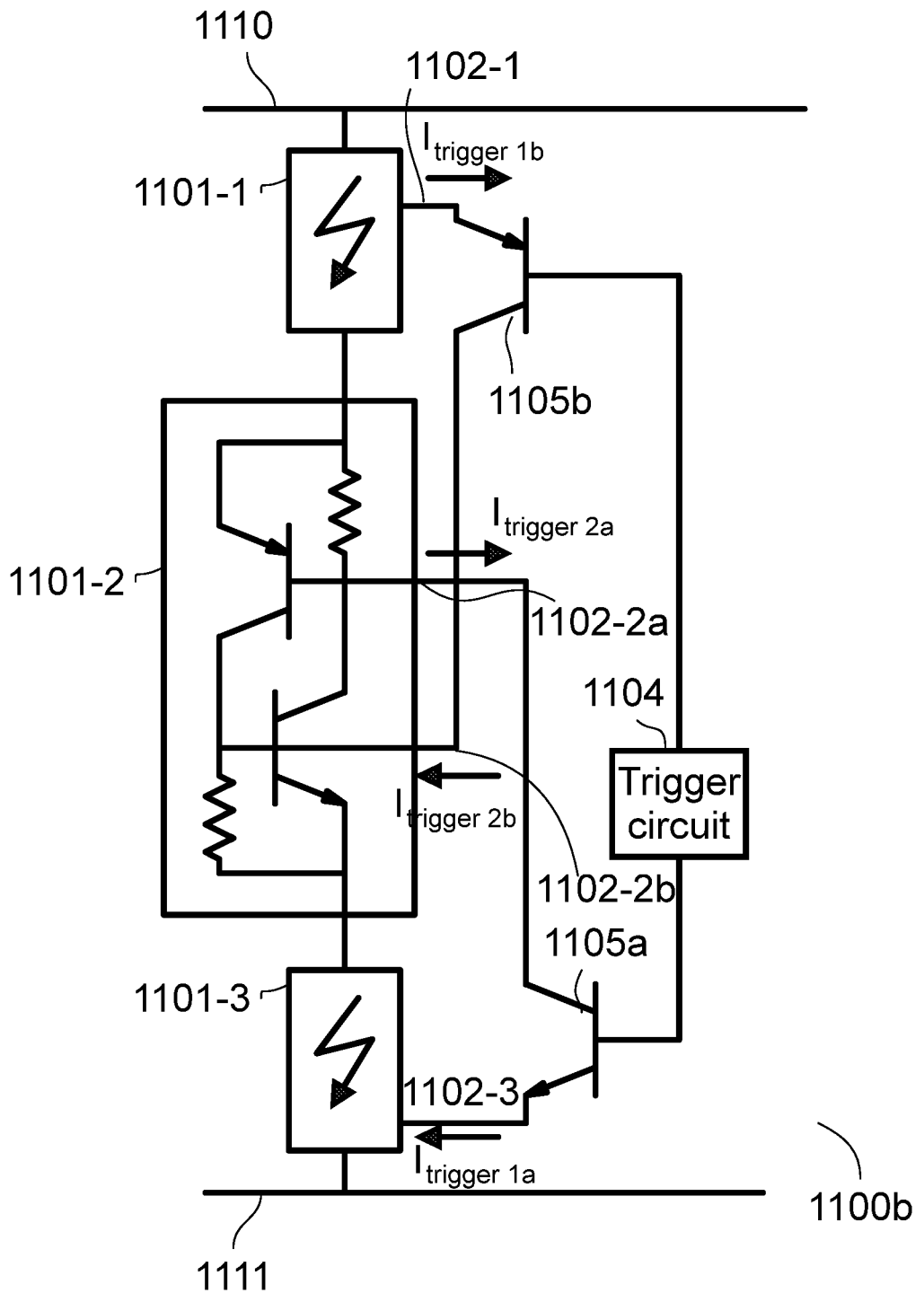
FIG. 11B is a schematic diagram depicting another example embodiment of an ESD protection device including an ESD clamp with multiple trigger taps, wherein the ESD clamp with multiple trigger taps is implemented by an SCR.

FIG. 11B is a schematic diagram depicting ESD protection device 1100b including an SCR implementation of ESD clamp 1101-2 with multiple trigger taps 1102-2a and 1102-2b. One should recognize that alternative implementations of ESD clamp 1101-2 are possible including but not limited to, for example, the SCR implementations depicted and described above with respect to FIGS. 10B and 10D.

One should further recognize that additional ESD clamps and transistors, such as additional transistors and ESD clamps in the example embodiments depicted in FIGS. 3A-3D and 5A-5D, may be added to the embodiments depicted in FIGS. 7A-7D, 8A, 8B, 9A, 9B, 10A-10D, 11A, and 11B in accordance with the teachings herein.

It should be recognized that the principles described with respect to one embodiment herein are also applicable to other embodiments described herein. Further, it should be noted that though the terms "first" and "second" are used throughout the description, reference to a "second" device does not require the presence of a "first" device. Rather, the terms "first" and "second" are merely used as modifiers to distinguish one device from another. For example, an ESD protection device may be described as including a second transistor without necessarily having a first transistor such that there is only one transistor in the example. This nomenclature applies to any elements, nodes, devices, or otherwise that are described herein and may be further applied to "third", "fourth", etc. without requiring the presence of three or four devices, respectively. Further, although the embodiments described and depicted herein include PNP bipolar transistors, NPN bipolar transistors, NMOS transistors, and PMOS transistors, any type of transistors or combination of types of transistors may be used. Furthermore, any combination of different types of transistors may be used within a single embodiment. Furthermore, the embodiments described herein may be implemented using different processes such as, but not limited to, complementary metal-oxide semiconductor (CMOS), bipolar-CMOS (BiCMOS), double diffused metal-oxide semiconductor (DMOS), silicon on insulator (SOI), fin field-effect transistor (FinFET), etc. In addition, although the figures depict direct couplings of elements to other elements, these direct couplings may alternatively be indirect couplings such that intermediate elements may be placed between elements without departing from the teachings provided herein.

What is claimed is:

1. An electrostatic discharge (ESD) protection device coupled between a first node and a second node, comprising:
   a first ESD clamp, a second ESD clamp, and a third ESD clamp, wherein an anode of the first ESD clamp is coupled to the first node, a cathode of the third ESD clamp is coupled to the second node, and the second ESD clamp is coupled between the first ESD clamp and the third ESD clamp;
   a first PMOS transistor, wherein a source of the first PMOS transistor is coupled to a trigger tap of the first ESD clamp and a drain of the first PMOS transistor is coupled to either a trigger tap of the second ESD clamp or a trigger tap of the third ESD clamp;
   a first resistor coupled to a gate of the first PMOS transistor; and
   a trigger circuit coupled between a gate of the first PMOS transistor and either the trigger tap of the third ESD clamp or the trigger tap of the second ESD clamp, wherein the trigger circuit is coupled to a different trigger tap than the drain of the first PMOS transistor, and wherein the trigger circuit is configured to conduct current in response to an ESD event.

2. The ESD protection device of claim 1, further comprising:
   a second PMOS transistor; and
   a fourth ESD clamp coupled between either the first ESD clamp and the second ESD clamp or the second ESD clamp and the third ESD clamp;
   wherein a source of the second PMOS transistor is coupled to the source of the first PMOS transistor, a gate of the second PMOS transistor is coupled to the gate of the first PMOS transistor, and a drain of the second PMOS transistor is coupled to a trigger tap of the fourth ESD clamp.

3. The ESD protection device of claim 1, further comprising:
   a second PMOS transistor;
   a second resistor coupled between a gate of the second PMOS transistor and a source of the second PMOS transistor; and
   a fourth ESD clamp coupled between the second ESD clamp and the third ESD clamp;
   wherein the source of the second PMOS transistor is coupled to the gate of the first PMOS transistor, the gate of the second PMOS transistor is coupled to an anode of the trigger circuit, a drain of the second PMOS transistor is coupled to a trigger tap of the fourth ESD clamp, and further wherein the trigger circuit is coupled to the gate of the first PMOS transistor through the second resistor.

4. The ESD protection device of claim 1, wherein the first resistor is coupled between the trigger tap of the first ESD clamp and the gate of the first PMOS transistor.

5. The ESD protection device of claim 1, further comprising:
   a first NMOS transistor;
   a second resistor; and
   a fourth ESD clamp coupled between either the second ESD clamp and the third ESD clamp or the first ESD clamp and the second ESD clamp;
   wherein the drain of the first PMOS transistor is coupled to the trigger tap of the second ESD clamp, the second resistor is coupled to a gate of the first NMOS transistor, a drain of the first NMOS transistor is coupled to a trigger tap of the fourth ESD clamp, a source of the first NMOS transistor is coupled to the trigger tap of the third ESD clamp, the trigger circuit is coupled to the gate of the first NMOS transistor, and the trigger circuit is coupled to the trigger tap of the third ESD clamp through the first NMOS transistor.

6. The ESD protection device of claim 1, wherein at least one of the first ESD clamp, the second ESD clamp, or the third ESD clamp includes a silicon controller rectifier (SCR).

7. The ESD protection device claim 1, wherein the first ESD clamp, the second ESD clamp, and the third ESD clamp are configured to shunt current from the first node to the second node in response to the trigger circuit conducting current.

8. An electrostatic discharge (ESD) protection device coupled between a first node and a second node, comprising:
   a first ESD clamp, a second ESD clamp, and a third ESD clamp, wherein an anode of the first ESD clamp is coupled to the first node, a cathode of the third ESD clamp is coupled to the second node, and the second ESD clamp is coupled between the first ESD clamp and the third ESD clamp;
   a first PNP transistor, wherein an emitter of the first PNP transistor is coupled to a trigger tap of the first ESD clamp and a collector of the first PNP transistor is coupled to either a trigger tap of the second ESD clamp or a trigger tap of the third ESD clamp; and
   a trigger circuit coupled between a base of the first PNP transistor and either the trigger tap of the third ESD clamp or the trigger tap of the second ESD clamp, wherein the trigger circuit is coupled to a different trigger tap than the collector of the first PNP transistor, and wherein the trigger circuit is configured to conduct current in response to an ESD event.

9. The ESD protection device of claim 8, further comprising:
a second PNP transistor; and
a fourth ESD clamp coupled between either the first ESD clamp and the second ESD clamp or the second ESD clamp and the third ESD clamp;
wherein an emitter of the second PNP transistor is coupled to the emitter of the first PNP transistor, a base of the second PNP transistor is coupled to the base of the first PNP transistor, and a collector of the second PNP transistor is coupled to a trigger tap of the fourth ESD clamp.

10. The ESD protection device of claim 8, further comprising:
a second PNP transistor; and
a fourth ESD clamp coupled between the second ESD clamp and the third ESD clamp;
wherein an emitter of the second PNP transistor is coupled to the base of the first PNP transistor, a base of the second PNP transistor is coupled to an anode of the trigger circuit, a collector of the second PNP transistor is coupled to a trigger tap of the fourth ESD clamp, and further wherein the trigger circuit is coupled to the base of the first PNP transistor through the second PNP transistor.

11. The ESD protection device of claim 8, further comprising:
a first NPN transistor; and
a fourth ESD clamp coupled between either the second ESD clamp and the third ESD clamp or the first ESD clamp and the second ESD clamp;
wherein the collector of the PNP transistor is coupled to the trigger tap of the second ESD clamp, a collector of the first NPN transistor is coupled to a trigger tap of the fourth ESD clamp, an emitter of the first NPN transistor is coupled to the trigger tap of the third ESD clamp, the trigger circuit is coupled to the base of the first NPN transistor, and the trigger circuit is coupled to the trigger tap of the third ESD clamp through the first NPN transistor.

12. An electrostatic discharge (ESD) protection device coupled between a first node and a second node, comprising:
a first ESD clamp, a second ESD clamp, and a third ESD clamp, wherein an anode of the first ESD clamp is coupled to the first node, a cathode of the third ESD clamp is coupled to the second node, and the second ESD clamp is coupled between the first ESD clamp and the third ESD clamp;
a first NMOS transistor, wherein a source of the first NMOS transistor is coupled to a trigger tap of the third ESD clamp and a drain of the first NMOS transistor is coupled to either a trigger tap of the first ESD clamp or a trigger tap of the second ESD clamp;
a first resistor coupled to a gate of the first NMOS transistor; and
a trigger circuit coupled between a gate of the first NMOS transistor and either the trigger tap of the second ESD clamp or the trigger tap of the first ESD clamp, wherein the trigger circuit is coupled to a different trigger tap than the drain of the first NMOS transistor, and wherein the trigger circuit is configured to conduct current in response to an ESD event.

13. The ESD protection device of claim 12, further comprising:
a second NMOS transistor; and
a fourth ESD clamp coupled between either the first ESD clamp and the second ESD clamp or the second ESD clamp and the third ESD clamp;
wherein a source of the second NMOS transistor is coupled to the source of the first NMOS transistor, a gate of the second NMOS transistor is coupled to the gate of the first NMOS transistor, and a drain of the second NMOS transistor is coupled to a trigger tap of the fourth ESD clamp.

14. The ESD protection device of claim 12, further comprising:
a second NMOS transistor;
a second resistor coupled between a gate of the second NMOS transistor and a source of the second NMOS transistor; and
a fourth ESD clamp coupled between the first ESD clamp and the second ESD clamp;
wherein the source of the second NMOS transistor is coupled to the gate of the first NMOS transistor, the gate of the second NMOS transistor is coupled to a cathode of the trigger circuit, a drain of the second NMOS transistor is coupled to a trigger tap of the fourth ESD clamp, and further wherein the trigger circuit is coupled to the gate of the first NMOS transistor through the second resistor.

15. The ESD protection device of claim 12, wherein the first resistor is coupled between the trigger tap of the third ESD clamp and the gate of the first NMOS transistor.

16. The ESD protection device of claim 12, further comprising:
a first PMOS transistor;
a second resistor; and
a fourth ESD clamp coupled between either the second ESD clamp and the third ESD clamp or the first ESD clamp and the second ESD clamp;
wherein the drain of the first NMOS transistor is coupled to the trigger tap of the second ESD clamp, the second resistor is coupled to a gate of the first PMOS transistor, a drain of the first PMOS transistor is coupled to a trigger tap of the fourth ESD clamp, a source of the first PMOS transistor is coupled to the trigger tap of the first ESD clamp, the trigger circuit is coupled to the gate of the first PMOS transistor, and the trigger circuit is coupled to the trigger tap of the first ESD clamp through the first PMOS transistor.

17. An electrostatic discharge (ESD) protection device coupled between a first node and a second node, comprising:
a first ESD clamp, a second ESD clamp, and a third ESD clamp, wherein an anode of the first ESD clamp is coupled to the first node, a cathode of the third ESD clamp is coupled to the second node, and the second ESD clamp is coupled between the first ESD clamp and the third ESD clamp;
a first NPN transistor, wherein an emitter of the first NPN transistor is coupled to a trigger tap of the third ESD clamp and a collector of the first NPN transistor is coupled to either a trigger tap of the first ESD clamp or a trigger tap of the second ESD clamp; and
a trigger circuit coupled between a base of the first NPN transistor and either the trigger tap of the second ESD clamp or the trigger tap of the first ESD clamp, wherein the trigger circuit is coupled to a different trigger tap than the collector of the first NPN transistor, and wherein the trigger circuit is configured to conduct current in response to an ESD event.

18. The ESD protection device of claim 17, further comprising:

a second NPN transistor; and a fourth ESD clamp coupled between either the first ESD clamp and the second ESD clamp or the second ESD clamp and the third ESD clamp;

wherein an emitter of the second NPN transistor is coupled to the emitter of the first NPN transistor, a base of the second NPN transistor is coupled to the base of the first NPN transistor, and a collector of the second NPN transistor is coupled to a trigger tap of the fourth ESD clamp.

19. The ESD protection device of claim 17, further comprising:

a second NPN transistor; and a fourth ESD clamp coupled between the first ESD clamp and the second ESD clamp;

wherein an emitter of the second NPN transistor is coupled to the base of the first NPN transistor, a base of the second NPN transistor is coupled to a cathode of the trigger circuit, a collector of the second NPN transistor is coupled to a trigger tap of the fourth ESD clamp, and further wherein the trigger circuit is coupled to the base of the first NPN transistor through the second NPN transistor.

20. The ESD protection device of claim 17, further comprising:

a first NPN transistor; and a fourth ESD clamp coupled between either the second ESD clamp and the third ESD clamp or the first ESD clamp and the second ESD clamp;

wherein the collector of the PNP transistor is coupled to the trigger tap of the second ESD clamp, a collector of the first NPN transistor is coupled to a trigger tap of the fourth ESD clamp, an emitter of the first NPN transistor is coupled to the trigger tap of the third ESD clamp, the trigger circuit is coupled to the base of the first NPN transistor, and the trigger circuit is coupled to the trigger tap of the third ESD clamp through the first NPN transistor.

* * * * *